US011928865B2

(12) United States Patent
Ryan et al.

(10) Patent No.: US 11,928,865 B2
(45) Date of Patent: Mar. 12, 2024

(54) METHOD FOR MONITORING OCCUPANCY IN A WORK AREA

(71) Applicants: Dan Ryan, Mountain View, CA (US); Kelby Green, Mountain View, CA (US)

(72) Inventors: Dan Ryan, Mountain View, CA (US); Kelby Green, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 0 days.

(21) Appl. No.: 18/084,305

(22) Filed: Dec. 19, 2022

(65) Prior Publication Data

US 2023/0215178 A1 Jul. 6, 2023

Related U.S. Application Data

(63) Continuation of application No. 17/320,151, filed on May 13, 2021, now Pat. No. 11,563,922, which is a
(Continued)

(51) Int. Cl.
*G06V 20/52* (2022.01)
*G05D 23/19* (2006.01)
(Continued)

(52) U.S. Cl.
CPC ......... *G06V 20/52* (2022.01); *G05D 23/1917* (2013.01); *G06F 18/23* (2023.01);
(Continued)

(58) Field of Classification Search
CPC ..... G05D 23/1917; G06F 18/23; H04N 7/188
See application file for complete search history.

(56) References Cited

U.S. PATENT DOCUMENTS 10,853,757 B1 * 12/2020 Hill ................. G06Q 10/06398
2012/0327179 A1 * 12/2012 Watson ................ H04N 23/661
348/E7.083
(Continued)

OTHER PUBLICATIONS

Synnott et al. "Detection of workplace sedentary behavior using thermal sensors." 2016 38th Annual International Conference of the IEEE Engineering in Medicine and Biology Society (EMBC). IEEE, (Year: 2016).*

*Primary Examiner* — Fabio S Lima
(74) *Attorney, Agent, or Firm* — Run8 Patent Group, LLC; Peter Miller

(57) ABSTRACT

One variation of a method for monitoring occupancy in a work area includes, at a sensor block: transitioning from an inactive state into an active state when an output of a motion sensor indicates motion in a work area; during a scan cycle in the active state, recording an image through an optical sensor at a time, detecting a set of humans in the image, detecting a second set of human effects in the image, predicting a second set of humans occupying but absent the work area based on the second set of human effects, and estimating a total occupancy in the work area at the time based on the set of humans and the second set of humans; and transmitting the total occupancy to a remote computer system for update of a scheduler for the work area.

20 Claims, 5 Drawing Sheets

Related U.S. Application Data continuation of application No. 16/828,676, filed on Mar. 24, 2020, now Pat. No. 11,044,445, which is a continuation-in-part of application No. 16/424,252, filed on May 28, 2019, now Pat. No. 10,659,737, which is a continuation of application No. 15/973,445, filed on May 7, 2018, now Pat. No. 10,742,940.

(60) Provisional application No. 62/502,132, filed on May 5, 2017.

(51) Int. Cl.
*G06F 18/23* (2023.01)
*G06V 10/143* (2022.01)
*H04N 7/18* (2006.01)

(52) U.S. Cl.
CPC ........... *G06V 10/143* (2022.01); *H04N 7/188* (2013.01); *G06V 20/53* (2022.01)

(56) References Cited

U.S. PATENT DOCUMENTS

| | | | |
|---|---|---|---|
| 2016/0275695 A1* | 9/2016 | Luczak | G06V 20/52 |
| 2016/0286624 A1* | 9/2016 | Patel | H05B 47/175 |
| 2016/0292515 A1* | 10/2016 | Jia | B66B 1/2408 |
| 2017/0054734 A1* | 2/2017 | Sigal | G06Q 10/06398 |
| 2018/0018805 A1* | 1/2018 | Kutliroff | G06V 20/20 |
| 2018/0100662 A1* | 4/2018 | Farahmand | G05B 19/0428 |
| 2018/0137369 A1* | 5/2018 | Roth | G06V 40/10 |
| 2018/0168020 A1* | 6/2018 | Casey | G01V 8/20 |
| 2018/0174325 A1* | 6/2018 | Fu | G06F 18/22 |
| 2019/0122065 A1* | 4/2019 | Ungarish | G06V 10/255 |

\* cited by examiner

METHOD FOR MONITORING OCCUPANCY IN A WORK AREA

CROSS-REFERENCE TO RELATED APPLICATIONS

This Application is a continuation application of U.S. patent application Ser. No. 17/320,151, filed on 13 May 2021, which is a continuation application of U.S. patent application Ser. No. 16/828,676, filed on 24 Mar. 2020, which is a continuation-in-part application of U.S. patent application Ser. No. 16/424,252, filed on 28 May 2019, which is a continuation application of U.S. patent application Ser. No. 15/973,445, filed on 7 May 2018, which claims the benefit of U.S. Provisional Application No. 62/502,132, filed on 5 May 2017, all of which are incorporated in their entireties by this reference.

TECHNICAL FIELD

This invention relates generally to the field of occupancy monitoring and more specifically to a new and useful method for monitoring occupancy in a work area in the field of occupancy monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
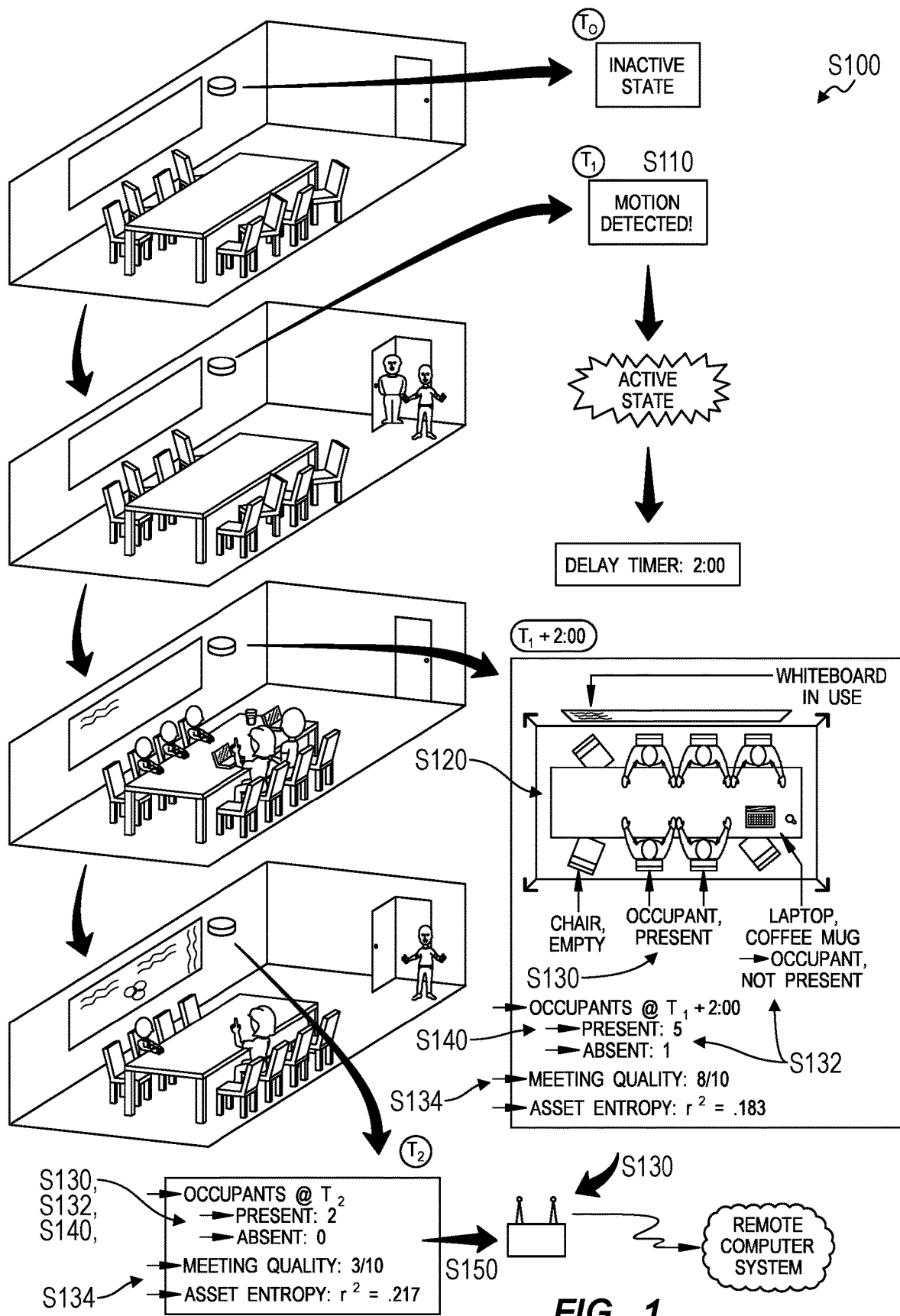
FIG. 1 is a flowchart representation of a method.
Figure 4:
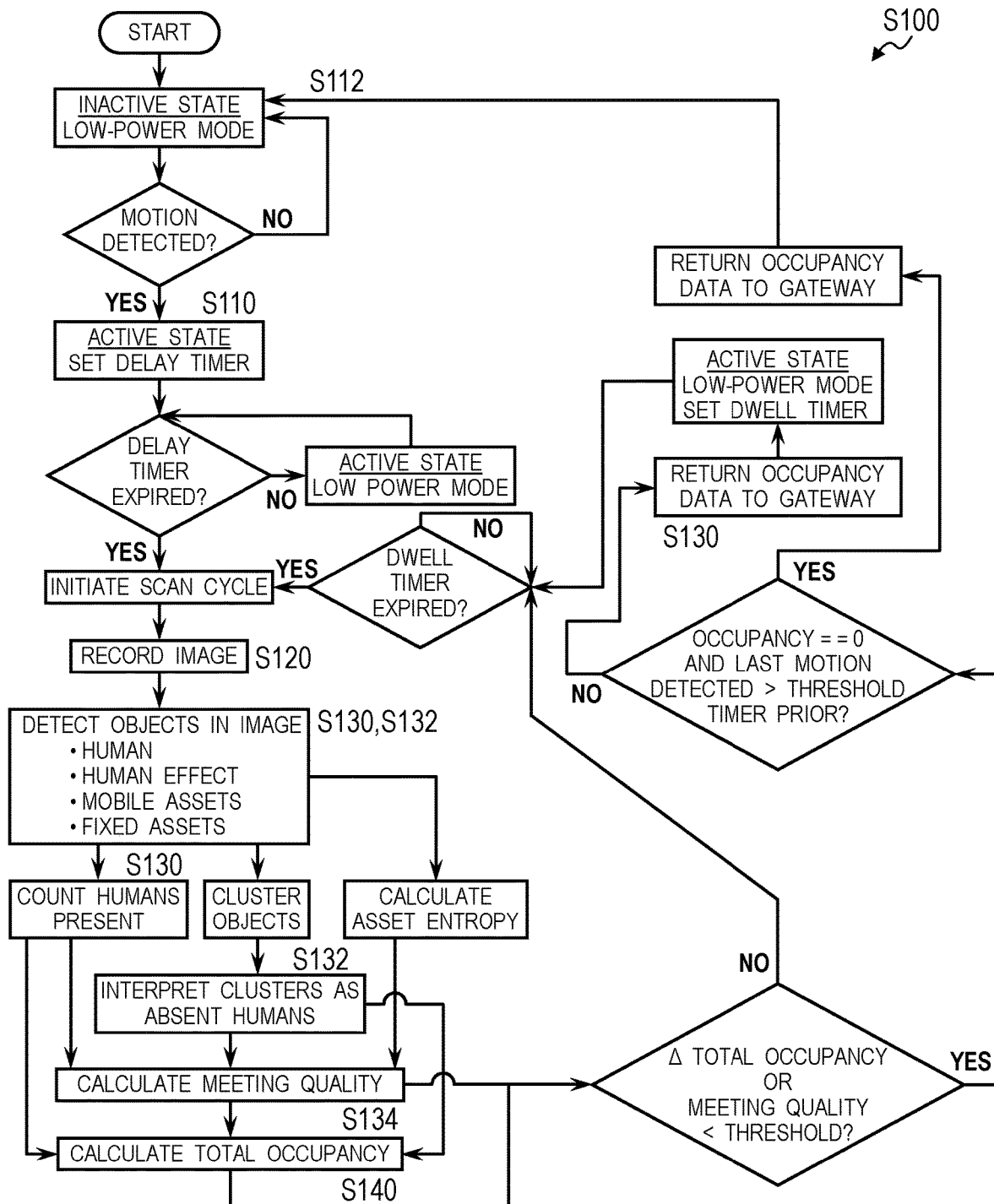
FIG. 4 is a flowchart representation of one variation of the method.

As shown in FIGS. 1 and 4, a method S100 for monitoring occupancy in a work area includes: at a sensor block, transitioning from an inactive state into an active state in Block S110 in response to an output of a motion sensor, integrated into the sensor block, indicating motion in a field of view of an optical sensor integrated into the sensor block, the field of view encompassing the work area; during a first scan cycle in the active state, recording a first image through the optical sensor at a first time in Block S120; detecting a first set of humans in the first image in Block S130, detecting a second set of human effects in the first image and predicting a second set of humans occupying but absent the work area based on the second set of human effects in Block S132; and estimating a first total occupancy in the work area at the first time based on the first set of humans and the second set of humans in Block S140; and transmitting the first total occupancy to a remote computer system for update of a scheduler for the work area in Block S150.

As shown in FIG. 1, one variation of the method S100 includes: at a sensor block, transitioning from an inactive state into an active state in response to a motion sensor, integrated into the sensor block, detecting a motion event within the conference room in Block S110; during a first scan cycle in the active state, recording a first image through an optical sensor—integrated into the sensor block and defining a field of view intersecting the conference room—at a first time in Block S120 and detecting a first set of humans in the first image in Block S130; transmitting the first total occupancy to a remote computer system for update of a scheduler for the conference room in Block S150; during a second scan cycle succeeding the first scan cycle in the active state, recording a second image through the optical sensor at a second time in Block S120 and detecting absence of humans in the second image in Block S130; and, in response to lack of outputs from the motion sensor indicating motion in the conference room for more than a threshold duration and detecting absence of humans in the second image, transmitting confirmation of vacancy in the conference room to the remote computer system for update of the scheduler for the conference room in Block S150 and transitioning from the active state into the inactive state in Block S112.

Figure 3A:
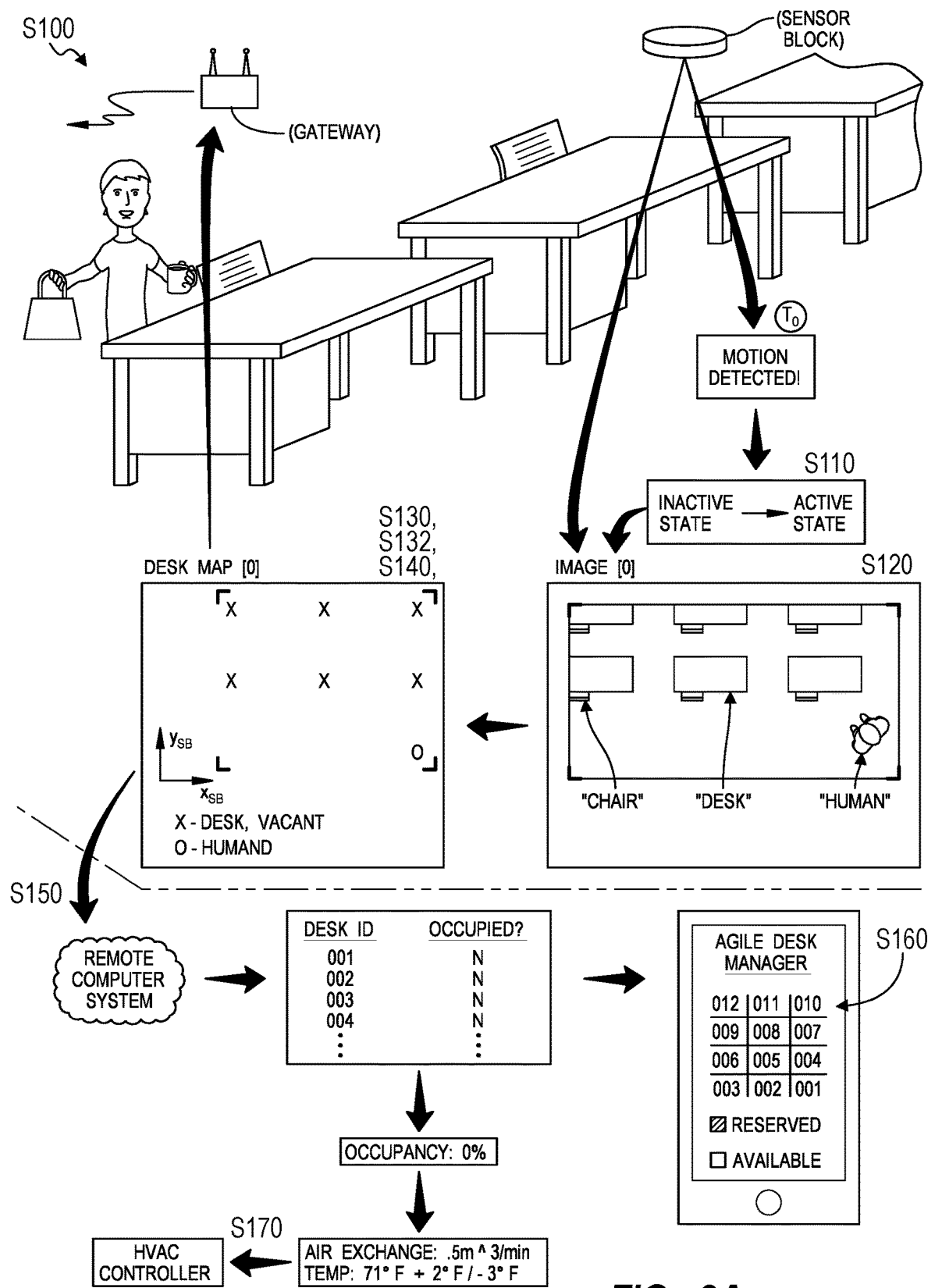
FIGS. 3A and 3B are flowchart representations of one variation of the method.
Figure 3B:
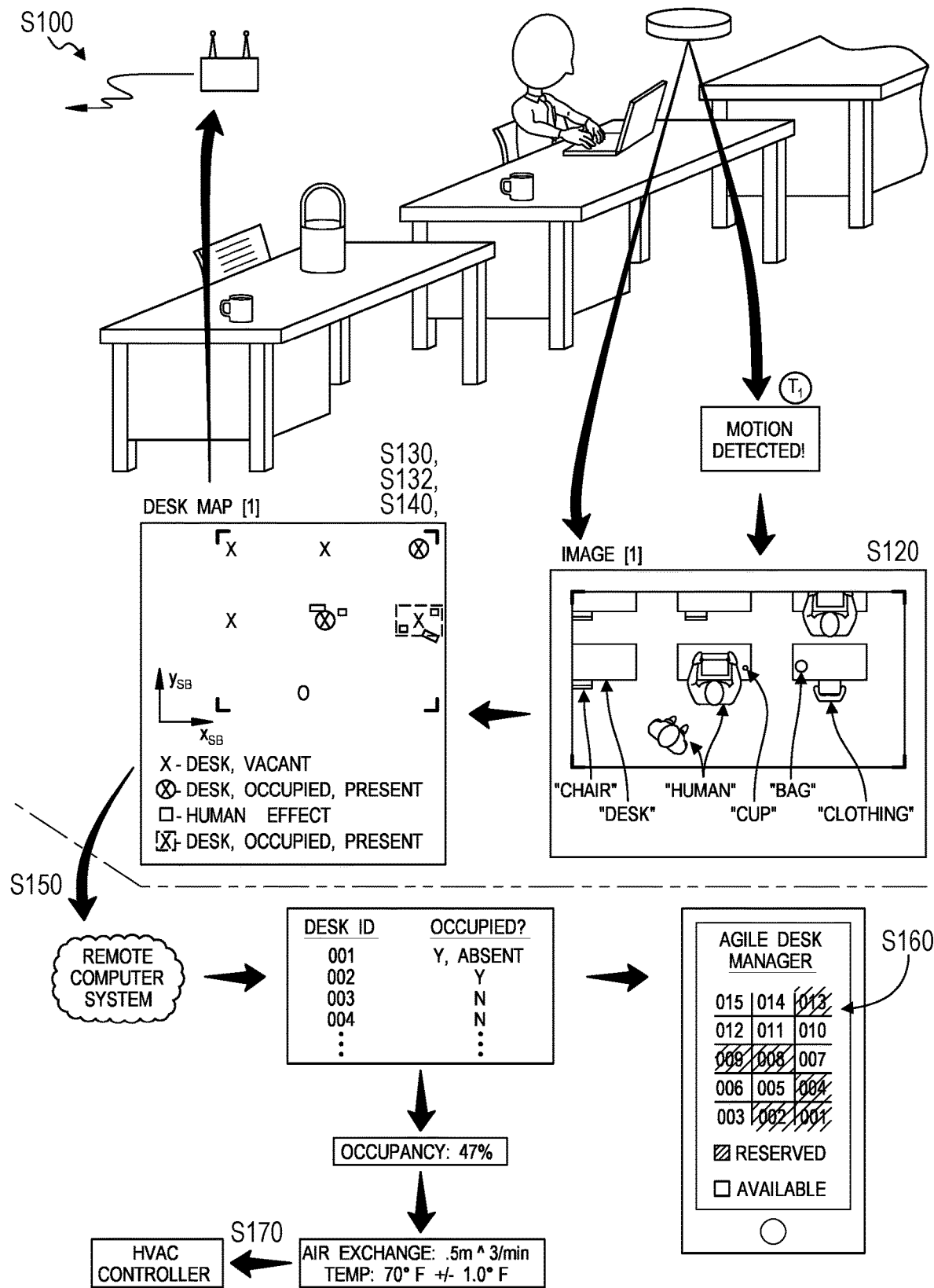

As shown in FIGS. 3A and 3B, another variation of the method S100 includes: at a sensor block, transitioning from an inactive state into an active state in Block S110 in response to a motion sensor, integrated into the sensor block, detecting a motion event within the agile work environment; during a first scan cycle in the active state, recording a first image through an optical sensor, integrated into the sensor block and defining a field of view containing a set of agile desks within the agile work environment, at a first time in Block S120; detecting a first set of humans in the first image in Block S130; interpreting proximity of the first set of humans, detected in the first image, to locations of a first subset of agile desks, in the set of agile desks, as occupancy of the first subset of agile desks at the first time in Block S140; detecting a second set of human effects in the first image in Block S132; interpreting proximity of the second set of human effects, detected in the first image, to locations of a second subset of agile desks in the set of agile desks and absence of humans proximal the second subset of agile desks as absent occupancy of the second subset of agile desks at the first time in Block S140; and transmitting confirmation of occupancy of the first subset of agile desks and the second subset of agile desks to a remote computer system for update of a scheduler for the agile work environment in Block S150.

2. Applications

Figure 2:
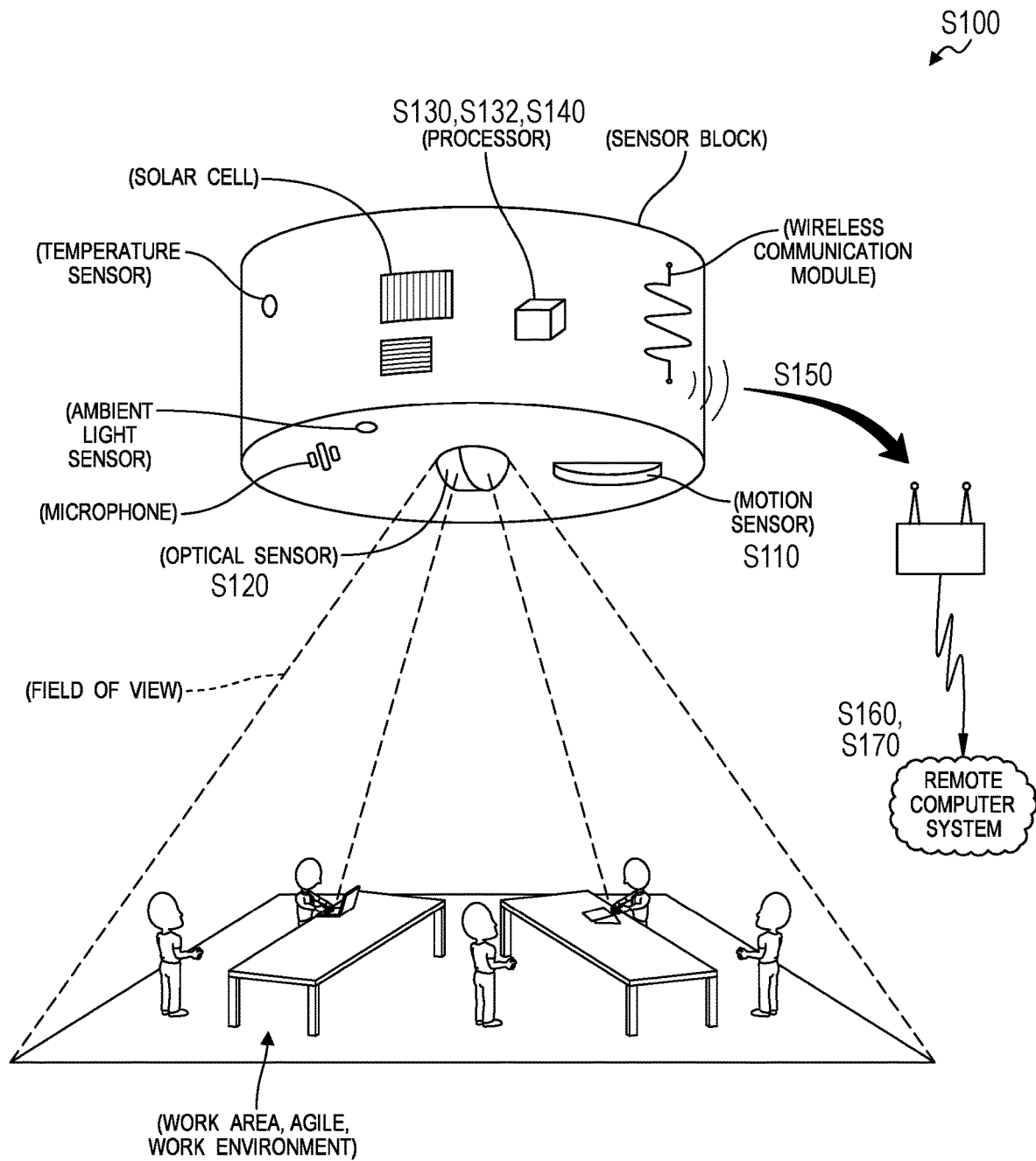
FIG. 2 is a flowchart representation of one variation of the method.

Generally, the method S100 can be executed within a work area—such as within a conference room, an agile work environment, a cafeteria, or a lounge, etc. within a facility—to monitor changes in human occupancy in the work area, to update schedulers or managers for assets and spaces within the work area, and to control various actuators throughout the work area based on these changes in human occupancy. As shown in FIG. 2, Blocks of the method S100 can be executed by a system including: a population of sensor blocks deployed throughout the facility; a remote computer system that updates schedulers, serves prompts for managers or administrators based on occupancy changes and states of spaces within the work area, and/or triggers various actuators within the facility based on data received from this population of sensor blocks; and local gateways arranged throughout the facility and configured to pass data between these sensor blocks and the remote computer system.

In particular, each sensor block can include an optical sensor (e.g., a camera; and various other sensors) and can be configured to mount to a wall, ceiling, or other surface within the field of view of the optical sensor facing an area of interest within the facility. For example, a sensor block an be arranged overhead and facing downward over a conference table in a conference room or arranged overhead and facing downward over a cluster of desks in an agile work environment within the facility. The sensor block can implement Blocks of the method S100 to record an image of an area of interest within the facility and to locally extract various insights from this image, such as locations and states of humans, desks, chairs, conference rooms, etc. within the area of interest. The sensor block can then upload these extracted data—rather than raw image data—to the remote computer system.

In particular, the sensor block can locally implement a computer vision and/or artificial intelligence module to compress this image into non-visual quantitative or qualitative insights or commands and offload these non-visual insights or commands for handling by the remote computer system or other affiliated systems to the exclusion of visual data recorded by the sensor block. The sensor block can regularly repeat this process of recording an image, extracting non-visual insights or commands from this image, and offloading these non-visual insights or commands throughout its operation in order to enable the remote computer system or other affiliated systems to respond to various events and changes within the work environment in (near) real-time.

Furthermore, by transmitting quantitative and qualitative insights extracted from an image—recorded by the sensor block—to the remote computer system rather than transmitting these images directly, the sensor blocks can preserve privacy for humans occupying the facility and ensure that operations and data moving inside the facility remain secure while also enabling the remote computer system to track humans, assets, and states of work areas throughout the facility.

As described below, a sensor block executing Blocks of the method S100 can also be battery-powered and can wirelessly transmit data to a local gateway, which passes these data to the remote computer system. Sensor blocks in this configuration may reduce or eliminate a burden of deploying various sensors throughout the facility by eliminating a need for fixed and power infrastructure at target sensor block locations throughout the facility and may thus enable rapid deployment (and redistribution) of sensor blocks throughout the facility.

However, to maximize battery life and thus limit maintenance for sensor blocks deployed throughout the facility, a sensor block can remain in an inactive (e.g., a "very-low-power" state) by default. However, when a passive motion sensor in the sensor block detects motion in the field of view of the sensor block, the sensor block can transition from the inactive state into an active state. While in the active state, the sensor block can record images, extract data from these images, and wirelessly transmit these data to a local gateway during intermittent scan cycles between periods of low-power operation. The sensor block can then transition back into the inactive state when the motion sensor no longer detects motion and when the sensor block detects no humans in a last image recorded by the sensor block. In particular, the sensor block can leverage a passive motion sensor to trigger transition into a higher-power, active state; however, even in the active state, the sensor block can operate predominately in a low-power state and only intermittently execute higher-power functions—including recording an image, processing this image, and/or wirelessly broadcasting data extracted from this image back to a gateway or remote computer system—such as on a ten-minute interval.

The sensor block can thus limit overall power consumption over time—which may peak during periods of image capture, image processing, and wireless data transmission (hereinafter "scan cycles")—while also: intelligently collecting recording images of a work area in the facility when such data extracted from these images may be most relevant to operation of the facility; collecting these data at a frequency coordinated (e.g., matched) to value of these data to operation and use of the facility; and/or intelligently offloading these data to the remote computer system (or to the gateway) when these data are immediately relevant to operation of the facility.

The population of sensor blocks installed throughout the facility can therefore locally execute Blocks of the method S100 to detect humans and assets moving throughout the facility, identify states of these humans and assets, and quantify or qualify use of various spaces and assets throughout the facility based on images recorded by these sensor blocks over time. By returning non-visual, quantitative and/or qualitative data extracted from these images, these sensor blocks can enable the remote computer system and/or other affiliated systems to update various schedulers (e.g., a conference room manager, an agile desk manager) or control various actuators (e.g., HVAC controls) within the facility, thereby improving operating efficiency of the facility, improving comfort of occupants within the facility, and/or improving productivity of occupants within the facility over time.

The method S100 is described below as executed by one sensor block in conjunction with one gateway and one remote computer system. However, the remote computer system can interface with any other number of gateways and any other number of sensor blocks—executing Blocks of the method S100—deployed throughout the facility.

2.1 Terms

The method S100 is described herein as executed by a system to detect or identify "human effects" proximal to a conference room, an agile desk in an agile work environment, or other work surface within the field of view of the optical sensor in the sensor block. The system can detect "human effects" that can include personal items or other objects carried by humans in a work environment and that are detectable via Blocks of the method S100 described below. These detectable "human effects" or personal items can include but are not limited to: laptop computers; tablet computers; smartphones, keyboards; electronic mice; charging and/or data transfer cables; beverage and/or food containers such as lunch boxes, thermoses, coasters; utensils such as plates, bowls, forks, knives, spoons; tissues, napkins and/or other sanitary supplies; personal fans; headphones; earphones; paperweights; staplers; personal plants; clothing such as shoes, jackets, hats, and/or other wearable accessories; eye glasses; glasses cleaners; glasses cases; virtual reality goggles; seat cushions; tools such as hand tools and straight edges; keys and keychains; wallets; pens or pencils; erasers; books; booklets; notebooks; notepads; sticky-notes; loose paper; organizational tools such as mail trays, folders, and/or binders; lamps; clocks; and/or whiteboards.

Additionally, the system can identify intransient assets (i.e. fixed assets) or transient assets (i.e. mobile assets) that are independent of human occupancy of a desk or conference room. More specifically, the system can: access a list of assets or a template image of each asset that is present, by default (e.g., provided by an administrator of the work environment), within an agile work environment or in a conference room (e.g., such as a computer monitor or laptop docking station). Therefore, the system can, in response to detecting these assets at a desk or conference room, exclude these assets from classification as a "human effect." Thus, the system can identify and detect "human effects" as the personal items or objects listed above excluding objects (such as mobile assets or fixed assets) provided to the work environment by administrators or employers in the work environment.

Furthermore, the system can also classify unidentifiable objects as "human effects" based solely on these object's context within images recorded by the system. More specifically, the system can, in response to failure to identify an object as a "human effect," a mobile asset, or a fixed asset, classify objects as "human effects" based on the presence of these objects on a desk, in a conference room, or proximal to another object classified as a "human effect" without specifically classifying the object as one of the categories of "human effects" described above. Thus, the system can classify an unidentifiable object as a "human effect" based only on the object's location relative to other detected objects or features within an image of an agile work environment or a conference room.

The method S100 is described herein as executed by a system to detect humans and human effects "proximal" or "proximal to" objects or locations within a work environment. Generally, the phrase "a first object proximal to a second object" refers to presence of the first object within a threshold distance (e.g., two meters) of the second object or within a predefined area associated with the second object (e.g., a surface of a desk and a rectangular area in front of the desk). The system can execute Blocks of the method S100 in response to detecting objects within a threshold distance or predefined area defined in association with the particular objects described as "proximal to" one another. In one example, the system can detect or identify "proximity" of a human or human effect to a desk within a work environment in response to the human or the human effect being located within three feet of the outer edge of the desk and desk chair associated with the desk. In another example, the system can detect or identify "proximity" of a human or a human effect in response to the human or the human effect being located within a predefined area delimited by a five-foot by eight-foot region overlapping the front of the desk. In yet another example, the system can detect or identify "proximity" of a human or human effect to a desk within a work environment in response to the human or the human effect being located within a statistically relevant area around the desk as indicated by machine learning models utilized to detect occupancy at the desk. In an additional example, the system can detect or identify "proximity" between two objects, both located on the surface of a desk in response to a first object being located within a ten-centimeter radius of a second object. Thus, the system can detect that a first object is "proximal" or "proximal to" a second object based on the specific objects being detected and these objects' context relative to the agile work environment.

3. Sensor Block

As shown in FIG. 2, a sensor block can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and an housing configured to contain the optical sensor, the motion sensor, the processor, the wireless communication module, and the battery and configured to mount to a surface within the field of view of the optical sensor intersecting an area of interest within the facility (e.g., a conference table within a conference room, a cluster of agile desks in an agile work environment)

The optical sensor can include: a color camera configured to record and output 2D color images; and/or a depth camera configured to record and output 2D depth images or 3D point clouds. However, the optical sensor can define any other type of optical sensor and can output visual or optical data in any other format.

The motion sensor can include a passive infrared sensor (or "PIR" sensor) that defines a field of view that overlaps the field of view of the optical sensor and that passively outputs a signal representing motion within (or near) the field of view of optical sensor. As described above, the sensor block can transition from an inactive state to an active state in Block S110 responsive to an output from the motion sensor indicating motion in the field of view of the motion sensor; the sensor block can then trigger the optical sensor to record an image (e.g., a 2D color image), which may capture a source of the motion detected by the motion sensor.

In one example, the motion sensor is coupled to a wake interrupt pin on the processor. However, the motion sensor can define any other type of motion sensor and can be coupled to the processor in any other way.

In one variation, the sensor block also includes: a distance sensor (e.g., a 1D infrared depth sensor); an ambient light sensor; a temperature sensor; an air quality or air pollution sensor; and/or a humidity sensor. However, the sensor block can include any other ambient sensor. In the active state, the sensor block can sample and record data from these sensors and can selectively transmit these data—paired with insights extracted from images recorded by the sensor block—to a local gateway in Block S150. The sensor block can also include a solar cell or other energy harvester configured to recharge the battery.

The processor can locally execute Blocks of the method S100, as described above and below, to selectively wake responsive to an output of the motion sensor, to trigger the optical sensor to record an image, to write various insights extracted from the image, and to then queue the wireless communication module to broadcast these insights to a nearby gateway for distribution to the remote computer system when these insights exhibit certain target conditions or represent certain changes.

The optical sensor, motion sensor, battery, processor, and wireless communication module, etc. can be arranged within a single housing configured to install on a flat surface—such as by adhering or mechanically fastening to a wall or ceiling—with the field of view of the optical sensor facing outwardly from the flat surface and intersecting an area of interest within the facility.

However, this "standalone," "mobile" sensor block can define any other form and can mount to a surface in any other way.

3.1 Wired Power and Communications

In one variation, the sensor block additionally or alternatively includes a receptacle or plug configured to connect to an external power supply within the facility—such as a power-over-Ethernet cable—and sources power for the optical sensor, processor, etc. from this external power supply. In this variation, the sensor block can additionally or alternatively transmit data—extracted from images recorded by the sensor block—to the remote computer system via this wired connection (i.e., rather than wirelessly transmitting these data to a local gateway).

4. Local Gateway

As shown in FIG. 2, the system can also include a local gateway: configured to receive data transmitted from sensor blocks nearby via wireless communication protocol or via a local ad hoc wireless network; and to pass these non-optical data to the remote computer system, such as over a computer network or long-range wireless communication protocol. For example, the gateway can be installed near and connected to a wall power outlet and can pass data received from a nearby sensor block to the remote computer system in (near) real-time. Furthermore, multiple gateways can be installed throughout the facility and can interface with many sensor blocks installed nearby to collect data from these sensor blocks and to return these data to the remote computer system.

In one variation, a sensor block transmits a (raw or compressed) image—recorded by the optical sensor in the sensor block during a scan cycle executed by the sensor block while in the active state—to a nearby gateway, and the gateway executes the method S100 and techniques described above and below to extract insights from this image and to return these insights to the remote computer system (e.g., sans the raw or compressed image).

5. Remote Computer System

As shown in FIGS. 2, 3A, and 3B, the remote computer system—such as a remote server—can receive non-optical data from one or more gateways installed in the facility (or directly from sensor blocks) and can manipulate these non-optical data to update schedulers for various spaces or assets in the facility in Block S160, to selectively trigger assistance or maintenance in certain areas of the facility, and/or control various actuators coupled to the facility in Block S170 based on these data, as described below.

6. Sensor Block Transition from Inactive State to Active State

Block S110 of the method S100 recites, at the sensor block, transitioning from an inactive state into an active state in response to an output of a motion sensor—integrated into the sensor block—indicating motion in a work area (e.g., a field of view of an optical sensor integrated into the sensor block). Generally, in Block S110, the sensor block can transition from an inactive state (e.g., a "low-power," sleep, or hibernate mode) into an active state when the passive motion sensor detects motion nearby (e.g., in the field of view of the optical sensor), since this motion may indicate a state change of the work area, state change of an asset in the work area, and/or presence of a human in the work area.

7. Scan Cycle

As shown in FIGS. 1, 3B, and 4, to execute a scan cycle in the active state, the sensor block can: record a first image through the optical sensor at a first time in Block S120; detect a first set of humans in the first image in Block S130; detect a second set of human effects (e.g., a computer, a coffee cup, a coat, a notebook, etc.) in the first image and predict a second set of humans occupying but absent the work area based on the second set of human effects in Block S132; and then estimate a first total occupancy in the work area at the first time in Block S140 based on the first set of humans and the second set of humans. Generally, while in the active state, the sensor block can execute a series of scan cycles between periods of low-power operation to calculate a series of total occupancy estimates for the work area in Blocks S130, S132, and S140. To minimize power consumption in the active state, the sensor block can execute each scan cycle in less than a first duration of time (e.g., in less than ten seconds) and return to a low-power mode during a second, longer duration (e.g., on a five-, ten-, or thirty-minute interval) before executing a next scan cycle.

In one implementation, the sensor block can immediately enter the active state in Block S110 and execute a scan cycle once the motion sensor detects motion, such as within five seconds of the sensor block entering the active state following detected motion in its field of view, in Block S120. Alternatively, in response to transitioning from the inactive state into the active state (or following detecting motion in its field of view), the sensor block can: set a delay timer for a duration associated with aggregation of humans in the work area (e.g., thirty seconds for the sensor block installed over a kitchen, one minute for the sensor block installed over an agile work environment, or two minutes for the sensor block installed in a conference room); and then execute a first scan cycle during this active state period only once the delay time expires.

During a scan cycle, the sensor block can: record an image; (sample and record values from other ambient sensors in the sensor block) in Block S120; and process the image to extract frequencies, locations, orientations, qualities, and/or states of humans and assets in the image (as described further below) in Blocks S130, S132, and S140. In one implementation, the sensor block: implements computer vision techniques to detect and identify discrete objects (e.g., humans, human effects, mobile assets, and/or fixed assets) in an image recorded by the optical sensor during a scan cycle; and implements a rule or context engine to merge types, postures, and relative positions of these objects into states of rooms, humans, and other objects. For example, the sensor block can implement object recognition, template matching, or other computer vision techniques to detect and identify objects in the image.

Alternatively, the sensor block can implement artificial intelligence techniques to extract states of rooms, humans, and/or objects directly from an image recorded during the scan cycle. For example, the sensor block can store and implement one or more artificial intelligence models—trained on labeled past images of the same work environment and/or work environments in other facilities—to interpret states of rooms, humans, and objects in an image recorded by the sensor block during a scan cycle. Similarly, in the application described below in which the sensor block is installed over an agile work environment and detects a first set of humans in an image, detects a second set of human effects in the image, and predicts a second set of humans occupying but absent the agile work environment based on the second set of human effects during a scan cycle, the sensor block can execute an artificial intelligence model locally on the sensor block to extract these features from the image and to interpret these features as a total occupancy in a region of the agile work environment—in the field of view of the optical sensor—at the time the image was recorded.

In the foregoing implementations, the sensor block can detect or distinguish humans directly from features extracted from an image recorded during the current scan cycle in Block S130. In Block S132, the sensor block can additionally or alternatively: detect human effects, such as clothing (e.g., a coat), a computing device (e.g., a smartphone, a tablet, a laptop computer), a notebook, and/or coffee cup, etc.; group these human effects into clusters based on proximity; and then interpret a cluster of human effects as occupancy of one human who is not present in the field of view of the optical sensor at the time the image was recorded but who may intend to return to the location of this cluster in the future, such as to collect these human effects, to rejoin a meeting, or to resume working.

The sensor block can also distinguish various fixed and/or mobile assets in the image, such as tables, desks, chairs, whiteboards, monitors or televisions, and/or cabinets, etc. The sensor block can then derive a state of a human occupying—and present or not present at—a location within the field of view of the optical sensor based on types and relative positions of these assets to the human's location (or to the location of a cluster of human effects interpreted as a unique human). For example, the sensor block can determine whether the human is working independently, eating, conversing, conferencing, walking, standing, sitting, etc. based on the human's posture, proximity of human effects and assets to the human, proximity of other humans to the human, and/or other features extracted from one image or from a series of images recorded by the sensor block during one scan cycle.

However, the sensor block can implement any other method or technique to qualify or quantify presence and/or occupancy of humans, human effects, mobile and fixed assets, and states of spaces within the field of view of the sensor block in Blocks S130 and S132.

At the conclusion of a scan cycle, the sensor block can also wirelessly transmit these insights extracted from the image, commands (e.g., HVAC commands, lighting commands, maintenance requests) generated locally by the sensor block based on these insights, and/or raw ambient sensor data back to a local gateway. Alternatively, the sensor block can store these insights locally (e.g., in a cache or buffer) and withhold wireless transmission of these data. The sensor block can then transmit data stored in the cache or buffer following a later scan cycle in which the sensor block detects certain trigger conditions in its field of view, such as a change in occupancy, a change in meeting quality, or a threshold change in asset entropy in the work area, as described below.

Upon completing a scan cycle, the sensor block can set a dwell timer for an interval between scan cycles and then enter a low-power mode, as shown in FIG. 4. When the dwell timer expires, the system can awake, execute a scan cycle, and then return to the low-power mode. The sensor block can repeat this process until the motion sensor detects no motion in the work area for a threshold duration of time and/or until the processor detects no humans in the field of view of the optical sensor.

8. Sensor Block Transition from Active State to Inactive State

In the active state, the sensor block can also record a last time of an output of the motion sensor that indicates motion in the work area. If this last time precedes a current time by more than a threshold duration, the sensor block can execute a scan cycle—such as outside of a preset time interval between consecutive scan cycles—to record a test image through the optical sensor and to scan the test image for humans and/or human effects. If the sensor block then detects—in the test image—absence of humans and absence of human effects that may otherwise indicate human occupancy in the work area in the field of view of the sensor block, the sensor block can transition from the active state back into the inactive state in Block S112, as shown in FIG. 4. In particular, if the sensor block fails to detect motion over a preset period of time—such as by actively sampling the motion sensor or by passively recorded motion events output by the motion sensor—the sensor block can selectively execute a scan cycle out of sequence; if the sensor block then fails to detect a human in the field of view of the optical sensor during this scan cycle, the sensor block can return to the inactive state in Block S112 since this work area is unlikely to exhibit a state change until subsequent motion is detected.

In a similar variation, once in the active state, the sensor block can execute a sequence of scan cycles, as described above. If, during a scan cycle in the sequence, the sensor block records an image in Block S120 and then detects absence of humans in the second image in Block S130, the sensor block can query a local log of motion events detected by the motion sensor. Given a lack of motion events detected by the motion sensor for more than a threshold duration of time (e.g., five minutes) and concurrent failure to detect humans in the image, the sensor block can: transmit confirmation of vacancy in the work area in Block S150; transmit occupancy, asset, and/or work area data generated during preceding scan cycles and stored in a local cache to the remote computer system in Block S150; and then transition from the active state into the inactive state in Block S112.

For example, for the sensor block installed in a conference room, the sensor block can thus determine that the conference room is vacant, offload both confirmation of vacancy in the conference room and data extracted from images recorded during a preceding meeting in the conference room to the remote computer system (e.g., via a local gateway), and then return to the inactive state until an occupant enters the conference room at the start of a next meeting. Concurrently, the remote computer system can update a scheduler for the conference room to reflect its current vacancy. In a similar example, for the sensor block installed over desks in a work area, the sensor block can thus determine that all desks in the work area are vacant, offload confirmation of vacancy in the work area and data extracted from images recorded over a preceding work period to the remote computer system, and then return to the inactive state until an occupant enters the work area at the start of a next work period (e.g., at the beginning of a work day or after a lunch hour). Concurrently, the remote computer system can update a manager for the work area to reflect vacancy in the work area; a manager or security personnel may then lock the building, turn off lights in the work area, or adjust an HVAC setting accordingly.

However, the sensor block can return to the inactive state in Block S112 responsive to any other event (or lack of event) detected in the field of view of the sensor block.

9. Conference Rooms

In one application shown in FIG. 1, the sensor block is installed on a ceiling or on a wall of a conference room, such as with a field of view of the optical sensor intersecting a conference table, a whiteboard, and/or a monitor located in the conference room. In this application, the sensor block can transition from the inactive state into the active state in Block S110 in response to the motion sensor detecting a motion event in the conference room, such as a door opening, a light turning on, or one or more humans walking into the conference room. While in the active state, the sensor block can execute a series of scan cycles between low-power periods to detect human occupancy in the conference room and to return measures of occupancy in the conference room to the remote computer system (e.g., via the local gateway) in Blocks S130, S132, S140, and S150.

In this application, the method S100 can further include Block S160, which recites, at the remote computer system, updating the scheduler associated with the conference room (hereinafter the "conference room manager") to indicate that the conference room is occupied at the first time based on the first total occupancy exceeding a threshold occupancy. In Block S170 described below, the remote computer system can additionally or alternatively: modify HVAC controls (e.g., to improve air quality or tighten controls on air temperature) when the sensor block indicates that the conference room is occupied, and vice versa; or prompt an administrator, support staff, or maintenance staff to service the conference room based on meeting qualities or conference room qualities derived and returned by the sensor block while in the active state.

9.1 Occupation Detection

In this application, the sensor block can implement the foregoing methods and techniques to transition from the inactive state in Block S110, to record an image during a scan cycle in Block S120, and to detect a human in the image—and therefore occupying the conference room—in Block S130. The sensor block can execute a first scan cycle immediately upon entering the active state in Block S120. Alternatively, the sensor block can delay executing a first scan cycle for a preset delay time (e.g., two minutes) after entering the active state, as described above, which may be sufficient time for meeting attendees to aggregate in the conference room such that occupancy detected by the sensor block during this first scan cycle is more likely to represent a maximum occupancy of the conference room during the meeting. By implementing this delay time, the sensor block can also reduce energy consumption for non-occupancy or non-use motion events, such as a human returning to the conference room to collect an item left during a previous meeting in the conference room. Once the sensor block thus detects and confirms occupancy of the conference room from data recorded during this first scan cycle in Block S130 and returns confirmation of occupancy to the remote computer system in Block S150, the sensor block can then execute scan cycles on a regular (or varying) interval until occupancy of the conference room is not longer detected.

During the first scan cycle and during subsequent scan cycles, the sensor block can also detect human effects present in the conference room and interpret clusters of human effects as intent of a human to return to the location of this cluster of human effects in the conference room, as shown in FIGS. 1 and 4, even though the human may not currently be present. For example, the sensor block can detect a computer, a coffee cup, a coat, and a notebook, etc. in an image recorded during a scan cycle in Block S130 and isolate a cluster of such human effects. The sensor block can then associate this cluster of human effects with one human occupant in Block S132, such as if this cluster of human effects: is located remotely from another human detected in the image; is located on or immediately adjacent an empty chair detected in the image; or if a human was detected in this chair or immediately adjacent these human effects during a preceding scan cycle.

In this example, the sensor block detects a first quantity of humans in a first image recorded during a first scan cycle while in the active state in Block S130 and outputs this first quantity of humans to the remote computer system in Block S150. If the sensor block later detects one fewer human in a second image recorded during a second, subsequent scan cycle, the sensor block can: predict that the departed human intends to return to the conference room during the current conference room meeting in Block S132 if the sensor block detects humans remain proximal the same location that the departed human was detected in the first image; and then preserve the first quantity as the current occupancy of the conference room in Block S140, even though the departed human was not directly detected in the second image.

However, if the sensor block fails to detect any humans in a third image recorded during a third, subsequent scan cycle and determines that most human effects located proximal these humans have been removed from the conference room based on features extracted from a third image recorded during a third, subsequent scan cycle, the sensor block can: predict that any human effects remaining in the conference room were left accidently in the conference room; transmit both confirmation of vacancy of the conference room and a notification for a possible lost personal item in the conference room to the remote computer system in Block S150; and then enter the inactive state in Block S112. The remote computer system can then: serve a notification to an owner and/or to invitees of the last scheduled meeting in the conference room—such as stored in the conference room manager—to indicate that a personal item may have been left in the conference room; and note the conference room as unoccupied in the conference room manager, as described below.

In this application, the sensor block can implement similar methods and techniques to detect: locations of chairs; whether chairs are occupied; whiteboard use; monitor or television use; etc. in the conference room from features in an image recorded during a scan cycle while in the active state.

9.2 Occupation Quality

In one variation shown in FIGS. 1 and 4, during each scan cycle executed by the sensor block while in the active state, the sensor block can: record an image through the optical sensor in Block S120; detect humans in the conference room at this time based on features detected in the second image in Block S130; and characterize engagement between humans in the conference room at this time based on features detected in the image and estimate a meeting quality in the conference room based on engagement between humans in the conference room at this time in Block S134. In this variation, the sensor block can also transmit both this meeting quality and occupancy of the conference room at this time to the remote computer system in Block S150.

In one example, after determining a total quantity of occupants in the conference room during a current meeting in Block S140, the sensor block calculates a quality of the meeting as a function of (e.g., proportional to) this quantity of occupants. The sensor block can also calculate a quality of the current meeting as a function of peak occupant density in the conference room, since high occupant density (i.e., occupants in close proximity) may suggest that these occupants are more engaged and working together. Similarly, the sensor block can also calculate a higher quality for the current meeting if the sensor block determines that occupants detected in the conference room are facing each other or if a microphone integrated into the sensor block detects a higher amplitude of sound during the current scan cycle or during a recent sequence of scan cycles; and vice versa.

The sensor block can also calculate a higher quality of the meeting as a function of types of assets used in the conference room. For example, the sensor block can: detect use of a whiteboard in the conference room based on proximity of a human to a known location of a whiteboard in the conference room or based on density of content in a region of an image—recorded during a current scan cycle—corresponding to the whiteboard; and then calculate a higher quality of the current meeting accordingly. In another example, the sensor block can: calculate an asset entropy of the conference room, as described below, which may indicate total use of assets in the conference room and thus an "energy" of the conference room; and calculate a quality of the current meeting as a function of (e.g., proportional to) this asset entropy.

In the foregoing examples, the sensor block can calculate a quality of: $1/10$ if only one human is detected in the conference room; $2/10$ if only one human is detected in the conference but is active in a conference or video call, such as determined from sound levels in the conference room or activity on a monitor or computer screen in the conference room; $3/10$ if multiple humans working independently or with minimal engagement are detected in the conference room; and $4/10$ or greater if multiple occupants actively engaged in a meeting are detected in the conference room, with greater conference room qualities calculated if the sensor block detects use of a whiteboard, high peak occupant density, and/or active conversation (e.g., through local sound level), etc.

However, in this application, the sensor block can derive a quality of a current meeting in the conference room in Block S134 in any other way and based on any other features detected in an image recorded by the sensor block or based on data recorded through any other sensors in the sensor block.

The sensor block can then transmit this derived meeting quality to the remote computer system, such as during the current scan cycle, when the sensor block wirelessly connects to the gateway during a future scan cycle, or when the meeting quality falls below a preset threshold quality.

9.3 Asset Entropy

In this application, the sensor block can also detect changes in mobile assets in the conference room, such as from a baseline state in the conference room, during the current meeting; and calculate a quantitative or qualitative "asset entropy" value that represents these changes, shown in FIGS. 1 and 4.

In one implementation, prior to a meeting in the conference room, the sensor block can: record an image of the conference room; detect locations (and orientations) of objects in the conference room from the image; and generate a baseline asset map for the conference room, which may define or indicate "ideal" or baseline types, frequencies, locations, and orientations of various assets (e.g., chairs, monitors, phones, whiteboards, trashcans, etc.) in the conference room. For example, the sensor block can: record a baseline image after a scheduled cleaning or maintenance of the conference room, such as at 10 PM on weekdays or 30 minutes before a scheduled meeting in the conference room; then extract a baseline asset map from this baseline image. In another example, the sensor block can: generate an asset map from features extracted from an image recorded during a last scan cycle during a preceding meeting in the conference room; and store this asset map as a baseline asset map for comparison to asset maps generated during a next meeting in the conference room.

Later, when the sensor block executes a scan cycle while a meeting is ongoing in the conference room, the sensor block can: record an image of the conference room; implement similar methods to extract an in-meeting asset map from this image; compare this in-meeting asset map to the baseline asset map to identify changes in locations and/or orientations of assets in the conference room; and then represent these changes as a singular asset entropy value for the current scan cycle within the current meeting. For example, the sensor block can calculate an asset entropy proportional to use of assets in the conference room, such as how far chairs in the conference room have moved from their baseline positions, whether a fixed monitor in the conference room has been activated, and whether content has been generated on a whiteboard—all of which may indicate more activity and more human engagement in the conference room.

However, the sensor block can calculate a qualitative of quantitative asset entropy value—representing changes in the state of the conference room and/or changes in the states or location of assets in the conference room in any other way.

The sensor block can repeat this process to calculate an asset entropy for each scan cycle and can selectively transmit asset entropy values to the conference room in Block S150, as described below.

9.4 Conference Room Scheduler Update

Upon receipt of an occupancy value from the sensor block, the remote computer system can update the conference room manager to reflect this occupancy value in Block S160, such as whether the conference room is occupied, a quantity of occupants, and/or a quality of a current meeting ongoing in the conference room. The conference room manager can then be rendered on a display adjacent a door of the conference room or accessed through web portals or native applications executing on computing devices accessed by employees, contractors, clients, visitors, etc. of the facility to view current occupancy, view upcoming reservations, and enter new reservations for the conference room (and various other conference rooms in the facility).

In one variation, the remote computer system can update the conference room manager to indicate that the conference room is occupied and unavailable (e.g., reserved, not currently bookable) if the last meeting quality received from the sensor block exceeds a threshold quality (e.g., a minimum meeting quality set by a manager of the facility or a building manager). However, if the second meeting quality falls below the threshold quality, the remote computer system can update the scheduler to indicate that the conference room as occupied but bookable, thereby enabling other occupants in the facility—who may be in need of a conference room to host a higher-quality meeting—to enter a reservation for the conference room over the existing meeting in the conference room and to displace current occupants from the conference room. In particular, if the quality of the current meeting in the conference room falls below the threshold quality, the remote computer system can update the conference room manager to reflect this low-quality meeting and enable members if the facility (e.g., employees, contractors, clients, visitors, etc.) to "bump" current occupant(s) out of the conference room in order to make room for a higher quality meeting, such as with more occupants and/or more engaged occupants.

In this variation, the remote computer system can activate this option to override a current low-quality meeting in the conference room: if current occupancy in the conference room is unscheduled; if a reservation for the current meeting in the conference room was entered within a threshold period of time (e.g., within the last hour); if fewer than a threshold proportion of invitees are noted in the reservation for the current meeting are detected by the sensor block in the conference room; or if the meeting quality has remained below the threshold quality for at least a threshold duration (e.g., five minutes, or a duration longer than a typical time for participants in a meeting to disperse from a conference room). In this variation, the remote computer system can additionally or alternatively limit this option to override a current low-quality meeting in the conference room for a replacement reservation that lists at least a threshold number of participants (e.g., at least four participants) predicted to yield or that commonly yields a meeting quality greater than the meeting quality of the current meeting.

However, in this variation, the remote computer system can update the conference room manager to reflect current occupancy or current meeting options for the conference room in any other way based on data received from the sensor block.

9.5 HVAC Controls

In one variation shown in FIGS. 3A and 3B, the remote computer system automatically modifies HVAC or other facility controls in Block S170 based on data received from the sensor block. In one implementation, in response to receipt of a total occupancy of the conference room—greater than null—from the sensor block, the remote computer system: tightens a tolerance on a target temperature in the conference room; and serves a command specifying a temperature change in the conference room to a ventilation control system (e.g., an HVAC system) in the facility. Generally, in this implementation, the remote computer system can apply a larger tolerance (i.e., a larger permitted variance, such as of +/−5° F.) for temperature in the conference room when the conference room is not occupied, which may reduce energy consumption in the facility. However, when the remote computer system receives confirmation of an occupant in the conference room from the sensor block, the remote computer system can immediately reduce the tolerance for temperature in the conference room (e.g., to +/−1.5° F.) and serve an HVAC command to drive the conference room closer to a target temperature within this narrow tolerance range in Block S170, thereby rapidly and automatically driving the conference room to a temperature more comfortable for current occupants of the conference room.

Subsequently, in response to detecting absence of humans and/or absence of human effects in an image recorded during a current scan cycle and prior to transitioning from the active state back into the inactive state, the sensor block can transmit confirmation of vacancy in the conference room to the remote computer system; in response to receipt of confirmed vacancy in the conference room from the sensor block, the remote computer system can again loosen the tolerance on the target temperature in the conference room.

In a similar implementation, the remote computer system can: reduce the tolerance for temperature in the conference room as a function of time that the sensor block has detected at least one occupant in the conference room during a current active state period; or once the conference room has been occupied for at least a threshold duration of time (e.g., one minute) in order to prevent cycling HVAC controls for the conference room when humans walk into and then quickly leave the conference room (e.g., to retrieve a personal item or to turn off a monitor in the conference room).

In another implementation, the remote computer system modifies a rate of air exchange through the conference room as a function of occupancy. For example, the sensor block can serve a quantity of humans in the conference room to the remote computer system each time the sensor block determines that a quantity of humans in the conference room has changed. In response to receiving a quantity of humans in the conference room from the sensor block in Block S150, the remote computer system can: calculate a target rate of air exchange in the conference room proportional to the quantity of humans in the conference room; and then serve a command specifying the target rate of air exchange to a ventilation control system connected to the conference room in Block S170. The sensor block and the remote computer system can therefore cooperate to automatically adjust a rate of air exchange in conference room as a function of number of occupants, including: increasing rate of air exchange in the conference room as occupancy increases in order to compensate for greater thermal output and respiration by these occupants and thus maintain a hospitable environment for occupants in the conference room; and reducing or stopping air exchange in the conference room when occupants leave the conference room in order to reduce energy consumption in the facility when the conference room is not occupied.

In this variation, the sensor block and the remote computer system can also cooperate to adjust latency of HVAC control output by the remote computer system based on various room characteristics. For example, during a setup period for the sensor block installed on a ceiling in the conference room, the processor can determine that sensor block is located on a ceiling based on an output of the orientation sensor integrated into the sensor block. The processor can then: sample a 1D depth sensor integrated into the sensor block to determine a distance from the sensor block to the opposing floor; record an image through the optical sensor; detect types of assets in the image, as described above; and then determine whether the sensor block is placed over a floor or over a table (i.e., whether the floor or a table is in the field of view of the depth sensor) based on whether a table is present in the center of the image. If no table is detected at the center of the image (or otherwise in the field of view of the depth sensor) and the processor thus determines that the sensor block is arranged over a floor, the processor can store the depth value as the height of the conference room. Otherwise, the processor can add a standard table height (e.g., 30") to the depth value and store this sum as the height of the conference room. The processor can then: detect a perimeter of the conference room in the image; extract a non-dimensional length and width of the room from the color image; transform the non-dimensional length and width values into a dimensioned length and width of the conference room based on known properties of the optical sensor and the height of the conference room; and then store a product of the length, width, and height of the conference room as a volume of the conference room.

The processor can implement similar methods and techniques to determine that the sensor block is installed on a wall of the conference room, to store an output of the depth sensor as a depth of the room, to extract a height and width of the room from an image recorded by the optical sensor, and to calculate a volume of the conference room accordingly.

The sensor block can then return this volume estimate of the conference room to the remote computer system; and the remote computer system can execute, generate, and serve HVAC controls more rapidly for conference rooms with smaller volumes in order to compensate for faster temperature and air quality changes when humans are present. The sensor block can additionally or alternatively set a time interval between scan cycles—executed by the sensor block in the active state—proportional to a volume of the room occupied by the sensor block, thereby enabling the sensor block to detect occupancy changes and to communicate these changes to the remote computer system more rapidly for smaller conference rooms, since ambient conditions in these smaller conference rooms may be affected more quickly by individual human occupants than ambient conditions in larger spaces in the facility.

However, the remote computer system can serve commands to the HVAC system or other controls in the facility in any other way in Block S170 in order to control an environment within the conference room responsive to any other data output by the sensor block in Block S150.

9.6 Data Offload

In one variation shown in FIG. 4, the sensor block can selectively return data to the remote computer system, such as via a local gateway, in Block S150. In particular, wireless transmission of data may be associated with relatively high energy cost and reduced battery life, such as compared to recording and processing images in Block S120, S130, and S132. The sensor block can therefore, selectively and intelligently offload data to the local gateway in Block S150 in order to extend battery life of the sensor block.

In one implementation, the sensor block executes a first scan cycle—including recording a first image at a first time—after entering the active state in Block S110 and transmits occupancy data for the conference room to the remote computer system—such as via the gateway—upon concluding the first scan cycle. While in the active state, the sensor block then executes a series of scan cycles between periods of low-power operation following the first scan cycle, as described above. During each scan cycle in this series of scan cycles, the sensor block can: record an image through the optical sensor in Block S120; detect a quantity of humans in the conference room based on features detected in this image in Blocks S130 and S132; and store these quantity data in a local cache. Throughout this active state period, the sensor block can also: record a last time that an output of the motion sensor indicated motion in the conference room; and execute a second scan cycle—including recording a second image through the optical sensor and scanning the second image for humans and human effects—out of order if the last time that the motion sensor detected motion precedes a current time by more than a threshold duration (e.g., five minutes). If the sensor block then detects absence of humans and absence of human effects indicative of human occupancy in the conference room in the second image, the sensor block can: transmit a time series of occupancy data for the conference room following the first time to approximately the current time—stored in the cache—to the local gateway in Block S150; and then transition from the active state into the inactive state in Block S112, as described above. At the conclusion of this active state period, the sensor block can additionally or alternatively: calculate a peak occupancy, an average occupancy, an occupancy variance, an activity level, a level of occupant engagement, assets engaged (e.g., chairs, monitors, or whiteboards used), an asset entropy, and/or a meeting quality, etc. for the meeting that just ended in the conference room; and then return these metrics to the remote computer system, such as via the gateway. The sensor block can therefore selectively connect and offload data to the gateway at the beginning and conclusion of an active state period, thereby enabling the remote computer system to respond to vacant and occupied states of the conference room, such as by updating the conference room manager in (near) real-time when the conference room transitions from vacant to occupied and vice versa.

In one example, the sensor block executes a first scan cycle upon entering the active state—including recording a first image at a first time and detecting a first distribution of objects in a first image recorded during this first scan cycle. During a second scan cycle at the conclusion of the current active state period, the sensor block: records a second image at a second time; detects a second distribution of objects in the second image; calculates an object entropy in the work area based on a difference between the first distribution of objects and the second distribution of objects; and then transmits the object entropy to the remote computer system. In response to receipt of this object entropy that exceeds a threshold entropy—which may correlate to disorder in the conference room—the remote computer system serves a prompt to straighten or clean the conference room to maintenance staff in the facility at approximately the second time, thereby enabling maintenance staff to quickly and judiciously focus efforts to tidying the conference room rather than other spaces exhibiting less deviation from a baseline (e.g., less entropy).

In another implementation, the sensor block transmits confirmation that the conference room is occupied to the remote computer system when at least one occupant has occupied the conference room for a threshold period of time (e.g., two minutes). For example, the sensor block can: execute a first scan cycle immediately upon entering the active state when the motion sensor detects motion in the conference room in order to confirm initial presence of an occupant in the conference room; execute a second scan cycle two minutes later to confirm that the conference room is still occupied; transmit confirmation of occupancy of the conference room to the local gateway in Block S150 only if the occupancy is detected during both the first and second scan cycles; resume executing scan cycles on a five-minute interval if such occupancy is detected; and otherwise return to the inactive state in Block S112.

The sensor block can additionally or alternatively transmit data to the gateway (or directly to the remote computer system) intermittently between the beginning and end of the current active state period. In one example, the sensor block regularly executes scan cycles and determines a quantity of occupants in the conference room during each scan cycle, as described above. During a current scan cycle, in response to the current quantity of humans in the conference room calculated by the sensor block differing from a quantity of humans detected in the conference room during a preceding scan cycle, the sensor block can transmit the current quantity of humans detected in the conference room to the remote computer system; otherwise, the sensor block can write various data extracted from the current image to the cache and return to the low-power mode before a next scan cycle. In the variation described above in which the sensor block and the remote computer system cooperate to serve HVAC commands to modify air quality in the conference room based on conference room occupancy, the sensor block can thus return occupancy data—in near real-time—to the remote computer system each time that a quantity of humans detected in the conference room changes (i.e., increases or decreases) while the conference room is occupied by as least one human. The remote computer system can then leverage these data to issue commands to ventilation control system within the facility in order to modify air quality (e.g., air temperature, rate of air exchange) in the conference room in (near) real-time as occupancy in the conference room changes.

In a similar implementation, the sensor block can selectively transmit occupancy data to the remote computer system if the sensor block detects occupancy in the conference room that exceeds a threshold quantity or a threshold proportion of seats allocated for the conference room. For example, if the sensor block detects occupancy that exceeds a preset occupancy threshold set for the conference room, the sensor block can immediately send these occupancy data to the remote computer system. The remote computer system can then: dispatch support staff to provide refreshments, confirm sufficient seating, provide technical assistance (e.g., for connecting to A/V equipment in the conference room), and/or confirm availability of presentation materials (e.g., whiteboard markers and erasers) in the conference room. The sensor block and the remote computer system can thus selectively prompt support staff to offer greater assistance in conference rooms that exhibit certain characteristics indicative of high-quality meetings.

The sensor block can additionally or alternatively selectively transmit occupancy data for the conference room to the remote computer system if a meeting quality derived from an image recorded by the sensor block during a current scan cycle falls below a preset threshold (e.g., $3/10$ or less). Upon receipt of these data from the sensor block, the remote computer system can update the conference room manager to reflect this lower-quality meeting, such as by enabling other employees, contractors, clients, visitors, etc. of the facility to "bump" current occupants out of the conference room, as described above.

Alternatively, the sensor block can transmit occupancy, environmental, meeting quality, asset entropy, and/or other data collected or derived during a current scan cycle to the remote computer system (e.g., via the local gateway) prior to the conclusion of the current scan cycle. In the example above in which the sensor block executed scan cycles on a ten-minute interval, the sensor block can thus connect to and upload conference room occupancy data, etc. to the gateway once per ten-minute interval following first confirmed occupancy of the conference room during a current meeting and up to a limited period of time after exit of a last occupant from the conference room.

However, the sensor block can selectively offload data of any other type and responsive to any other condition detected in the conference room in Block S150.

10. Agile Work Environment

In another application shown in FIGS. 3A and 3B, the sensor block is installed on a ceiling or on a wall adjacent an agile work environment containing a set of non-dedicated work surfaces, such as desks, tables, or workstations (hereinafter "agile desks") that are not reservable or that are reservable for limited durations of time, such as for one hour, one day, or for one week. In particular, in this application, the sensor block can be arranged within the facility with the motion sensor and the optical sensor defining fields of view intersecting all or a portion of the agile work environment. The sensor block can thus transition from the inactive state into the active state in response to the motion sensor detecting a motion event in the agile work environment in Block S110. During a scan cycle, the sensor block can then: record an image through the optical sensor defining a field of view occupied by a set of agile desks in Block S120; interpret proximity of a first set of humans to locations of a first subset of these agile desks—detected in the image—as occupancy of the first subset of agile desks (hereinafter "present occupancy") in Block S130; and interpret proximity of a second set of human effects (e.g., clothing, bags, coffee cups, notebooks, laptop computers) to locations of a second subset of agile desks and absence of humans proximal the second subset of agile desks—detected in the image—as human-not-present occupancy (hereinafter "absent occupancy") of the second subset of agile desks.

The sensor block can therefore locally implement a contextual model to extract contextual understanding of present and absent occupancy of a desk from both human and non-human features detected near this desk in an image recorded by the sensor block during a scan cycle; the sensor block can then return these occupancy data to the remote computer system in Block S150. The remote computer system can then update a scheduler associated with the set of agile desks (hereinafter an "agile desk manager") in (near) real-time to indicate that the first and second subsets of agile desks are occupied based on occupancy data received from the sensor block. Employees, contractors, clients, and/or visitors, etc. of the facility may then access this agile desk manager—such as through a web browser or native application executing on a personal computing device or through a user interface rendered on a display near the agile work environment—to view and reserve available desks.

In one implementation, a remote computer system can: populate a virtual representation of the agile work environment with representations of desks in the agile work environment and these desk's last-detected occupancy states; and update a graphical user interface within the agile desk manager rendered on a display. Therefore, the agile desk manager can render desk representations marked by distinct graphical representations of each occupancy state in the group of occupancy states (including "occupied with human present," "occupied with human absent," and "vacant"). The agile desk manager can render a map indicating relative locations of each desk in the agile work environment and render a representation of each desk indicating the occupancy state associated with that desk. In one example, the agile desk manager can represent: that a desk is occupied with a human present via a first graphical representation associated with the "occupied with human present" occupancy state (e.g., a red color of the graphical representation of the desk); that the desk is occupied with a human absent via a second graphical representation associated with the "occupied with human absent" occupancy state (e.g., an orange color of the graphical representation of the desk); and that the desk is vacant via a third graphical representation associated with the "vacant" occupancy state (e.g., a green color of the graphical representation of the desk). Thus, the agile desk manager can distinguish each occupancy state of a desk in a user interface representing the agile desk environment.

10.1 Desk Locations and Types

In one implementation, the sensor block implements methods and techniques described above to detect desks in the field of view of the optical sensor during a setup period, automatically generates a "desk map" representing locations and orientations of desks detected in the field of view of the sensor block, and uploads the desk map to the remote computer system, such as via the gateway. Other sensor blocks in the agile work environment can implement similar methods and techniques to return desk maps representing locations of desks in other discrete or overlapping areas of the agile work environment. The remote computer system can then aggregate desk maps—received from this population of sensor blocks arranged throughout the agile work environment—and compile these desk maps into a "global desk map" representing positions and orientations of desks throughout the agile work environment based on known positions and orientations of these sensor blocks throughout the agile work environment.

In this implementation, the remote computer system can then serve this desk map to an administrator affiliated with the agile work environment—such as through an administrator portal accessible through a web browser or native application—and then prompt the administrator to manually label types of work areas or types of specific desks in this global desk map. For example, the remote computer system can prompt the administrator to label each desk, cluster of desks, or region in the agile work environment as one of: dedicated (i.e., permanently assigned to employees); agile and bookable (i.e., non-dedicated but bookable by employees, etc. for limited periods of time according to defined rules); or agile and non-bookable (i.e., non-dedicated and not bookable). The remote computer system can then generate an agile desk manager or selectively apply predefined rules for desks in the agile work environment based on desk type labels provided by the administrator.

Alternatively, the remote computer system can access an existing floor plan of the agile work environment; extract a global desk map from this floor plan, such as by implementing computer vision techniques; interface with an administrator of the agile work environment to label desk types in this global desk map, such as described above; and then port desk type labels from this global desk map onto desk maps generated by sensor blocks throughout the agile work environment based on known positions and orientations of these sensor blocks within the agile work environment.

Yet alternatively, the remote computer system can serve an image recorded by a sensor block during a setup period to an administrator portal and prompt the administrator to label locations and types of desks in this image within the administrator portal. For example, the administrator can draw a desk boundary around the perimeter of each desk in the image or around the desk and a floor area around the desk and label each of these desk boundaries with a type of desk contained therein. The remote robotic system can then return these desk boundaries to the sensor block, and the sensor block can implement these desk locations, boundaries, and types to monitor occupancy of agile desks in Blocks S130 and S132.

However, a sensor block and the remote computer system can cooperate in any other way to access or generate a global desk map labeled with locations and types of agile desks throughout the agile work environment.

10.2 Agile Desk Rules

The remote computer system can also access rules for agile desks in the agile work environment, such as: a maximum duration over which an agile may be reserved by one user before the reservation is cleared and the agile desk noted as available in the agile desk manager; a maximum duration that an agile desk may be occupied while a human is not present before the agile desk is noted as available in the agile desk manager; and/or a maximum duration of time that a reservation for an agile desk is held for a user while the agile desk remains unoccupied before the reservation is cleared.

In one implementation, the remote computer system prompts the administrator to manually define these rules or to selectively link these rules to agile desks throughout the agile work environment, such as through an administrator portal. Alternatively, the remote computer system can extract these rules from an existing agile desk manager for the facility.

10.3 Human Occupancy

As described above, a sensor block can remain in the inactive state by default and then transition into the active state when an output of the motion sensor indicates motion within the field of view of the sensor block. While in the active state, the sensor block can execute scan cycles on a regular interval, such as once per ten-minute interval, between low-power periods.

10.3.1 Human Occupancy with Human Present

After recording an image during a scan cycle in Block S120, the sensor block can implement methods and techniques described above to detect humans, mobile assets (e.g., chairs, laptop computers), human effects (e.g., coffee mugs, bags, clothing), and fixed assets (e.g., desks) in the image in Blocks S130 and S132. The sensor block can additionally or alternatively leverage predefined locations or boundaries of desks—in the field of view of the optical sensor—received from the remote computer system, as described above, to isolate desks in the image. The sensor block can then selectively associate humans and/or objects detected in the image with certain desks in the agile work environment.

In one implementation, the sensor block implements artificial intelligence and computer vision techniques described above or leverages desk locations or desk boundaries received from the remote computer system (e.g., extracted from a floor plan of the facility by the remote computer system or manually labeled by an administrator) as described above to isolate a set of desks in the image. Upon detecting a first human in the image, the sensor block can associate this human with a first agile desk detected in the image if the first human is occupying a chair, is facing the front of the first agile desk, and falls within a first threshold distance (e.g., one meter) of the first agile desk; and mark first desk as occupied in Block S130. The sensor block can also associate a second human with a second agile desk—both detected in the image—if the second human is standing at the front of the second desk and is within a second threshold distance less than the first threshold distance (e.g., one-half meter) of the second desk in Block S130.

In Block S130, the sensor block can alternatively calculate a probability that a human is occupying a desk based on similar features detected in the image. For example, the sensor block can calculate greater probability that a human is occupying a desk if the human is seated in a chair, if the human is facing the front of the desk, and if the human's hands are located over the desk (e.g., over a notepad, computer, or keyboard also detected on the desk). The sensor block can also calculate this probability as an inverse function of a distance from the human to the desk and proportional to a number of contiguous scan cycles over which the sensor block determined that the desk was occupied.

10.3.2 Human Occupancy with Human Not Present

In the foregoing implementation, upon detecting a cluster of human effects and/or mobile assets (e.g., a bag, a coat, a laptop computer, and/or a coffee mug) in the image, the sensor block can also: group a subset of objects arranged on or near a third desk in the image into a cluster of objects; and then associate this cluster of objects with occupation of the third desk by a third human even though the third human was not present at the third desk at the time the sensor block recorded the image, as shown in FIG. 3B. For example, in Block S132, the sensor block can: detect computing devices, clothing, notebooks, and drink containers, etc. in the image; and group human effects in the first image into a set of clusters of human effects based on proximity to one another or proximity to locations (e.g., centroids) or boundaries of nearby desks. The sensor block can then associate a particular cluster of human effects with a particular agile desk, such as if human effects in this particular cluster: intersect the particular agile desk detected in the image; fall within a boundary (e.g., extracted from the image or predefined and stored in memory on the sensor block) of the particular desk; or fall within a threshold distance of a centroid (e.g., extracted from the image or predefined and stored in memory on the sensor block) of the particular desk. Finally, the sensor block can predict absent occupancy of the particular agile desk based on the particular cluster of human effects and absence of a human—detected in the first image—within a threshold distance of the particular agile desk or within the predefined boundary around the particular desk in Block S132. For example, if this cluster of human effects falls within the boundary of the particular desk and includes a sufficient number, certain types, or a particular combination of human effects known to exhibit a high likelihood of human occupancy, the sensor block can interpret these human effects as occupancy of the particular desk in Block S132 regardless of whether a human is detected sitting or standing near the particular desk.

Alternatively, the sensor block can calculate a probability that the particular desk is occupied. For example, the sensor block can store a lookup table for values of human indicators for various types of human effects and mobile assets. Upon recording an image and detecting human effects and mobile assets in this image in Blocks S120 and S132, the sensor block can: calculate a distance from the centroid of each of these objects to a centroid of a desk in the image; weight the human indicator value for each of these objects based on distance (e.g., a square of the distance) from the centroid of the desk; and sum or compile these weighted human indicator values to calculate a probability that the desk is occupied in Block S132. The sensor block can then predict that a human is occupying but not present at the particular desk if this probability exceeds a preset threshold.

Yet alternatively, the sensor block can implement artificial intelligence techniques to transform the image into occupancy states or probabilities of occupancy at a desk represented in the image.

However, the sensor block can implement any other methods or techniques to interpret presence of human effects, mobile assets, etc. into occupancy of a nearby desk. The sensor block can repeat these methods and techniques for each other desk represented in the image recorded during the current scan cycle, and the sensor block can repeat this process during each subsequent scan cycle during the current active state period.

10.3.3 Desk Vacancy

Furthermore, during a scan cycle, the sensor block can interpret absence of humans and absence of human effects—detected in the image—proximal the location of a particular agile desk as vacancy of the particular agile desk. For example, if the sensor block detects no human within a threshold distance of the particular desk, if the sensor block detects fewer than a threshold number or type of human effects within a boundary of the particular desk, or if the sensor block calculates a probability of human occupation less than the preset threshold described above, the sensor block can determine that the particular desk is vacant.

10.4 Occupancy Data Format

In preparation to offload desk occupancy data to the remote computer system in Block S150, the sensor block can compile occupancy states of desks in its field of view into a format readable by the remote computer system (or by the agile desk manager). In one implementation shown in FIGS. 3A and 3B, the sensor block generates a list or matrix of desk locations of each desk detected in an image recorded by the sensor block during the current scan cycle, such as with each desk delineated by the latitude and longitude of its centroid in a local coordinate system implemented by the sensor block. The sensor block then writes the occupancy of each desk—determined by the sensor block during the current scan cycle—to its corresponding cell in the list or matrix, such as a value for one of "occupied with human present," "occupied with human absent," or "vacant."

Upon receipt of this list or matrix from the sensor block, the remote computer system can then: transform each desk location—in this list or matrix—in the sensor block coordinate system in a desk location in a global coordinate system for the agile work environment or for the facility more generally based on a known position and orientation of the sensor block in the agile work environment; and match each of these corrected desk locations to a known desk in the agile work environment, such as to associate each desk location indicated in this list or matrix received from the sensor block with an unique identifier of one agile desk in the agile work environment.

For example, the sensor block can transmit, to the remote computer system: confirmation of present occupancy of a first subset of agile desks; confirmation of absent occupancy of a second subset of agile desks; confirmation of vacancy of a third subset of agile desks; and locations of the first, second, and third subsets of agile desks in the field of view of the optical sensor to the remote computer system at the conclusion of a scan cycle in Block S150.

Alternatively, in this implementation described above in which the remote computer system returns a desk map or desk boundaries for agile desks in the field of view of the optical sensor to the sensor block, the remote computer system can also return a unique identifier for each of these desk locations or desk boundaries to the sensor block. In this implementation, the sensor block can thus return a unique identifier and an occupancy state for each desk in its field of view to the remote computer system to conclude a scan cycle in Block S150.

In the foregoing implementation, the remote computer system can then: reference locations of these agile desks to a map of known agile desk locations in the agile work environment to determine a unique identifier of each of these agile desks; and update the agile desk manager to reflect these current occupancy states based on these unique identifiers in Block S160.

However, the sensor block can package the desk occupancy data in any other format prior to offloading these data to the remote computer system.

10.5 Data Offload

The sensor block can implement the foregoing processes to determine occupancies of desks in its field of view and to return these occupancies to the remote computer system during a scan cycle. For example, the sensor block can return occupancy states of desks in its field of view at the conclusion of each scan cycle.

Alternately, the sensor block can selectively upload data to the remote computer system, such as only when an occupancy state of at least one desk in its field of view has changed since a preceding scan cycle. For example, the sensor block can selectively upload data to the remote computer system when the sensor block determines that an occupant has left a previously-occupied desk or when an occupant is detected at a previously-vacant desk. In a similar example, during a scan cycle, the sensor block can: calculate a distribution of occupancy and vacancy of agile desks in the agile work environment; and then transmit the current distribution of occupancy and vacancy of these agile desks to the remote computer system if the current distribution of desk occupancy and vacancy differs from a distribution of desk occupancy and vacancy detected during the preceding scan cycle. The remote computer system can then automatically update the agile desk manager to reflect this change in (near) real-time (e.g., within seconds) of the sensor block returning these data.

In another implementation, the sensor block can store a local copy of predefined rules for desks in the agile work environment and can push desk occupancy data to the remote computer system when the sensor block determines that one of these rules has been violated. For example, these predefined rules can specify a maximum time limit of eight hours for occupation of an agile desk. In this example, if the sensor block detects the same human, the same combination of human effects, and/or the same mobile asset(s) at one agile desk in its field of view over a series of scan cycles over an eight-hour period, the sensor block can: connect to the local gateway; wirelessly transmit desk occupancy data—including a flag for time overage at this agile desk—to the local gateway; and then return to the low-power mode. Upon receipt of these data, the remote computer system can: notify an administrator of this time overage (e.g., by generating and transmitting an email or other electronic notification to the administrator's computer or smartphone); and/or update the agile desk manager to reflect this time overage, such as to enable another employee to reserve this desk.

In a similar example, these predefined rules can specify a maximum time limit of two hours for occupation of an agile desk while a human is not present. In this example, if the sensor block detects objects (e.g., human effects and/or mobile assets) that suggest occupancy at one agile desk but fails to detect a human occupying this agile desk (e.g., within a threshold distance of the agile desk) during a series of scan cycles within a two-hour period, the sensor block can: connect to the local gateway; wirelessly transmit desk occupancy data—including a flag for abandonment of this agile desk—to the local gateway; and then return to the low-power mode. If other agile desks in the agile work environment are at or near capacity (e.g., more than 85% of these agile desks are occupied) at this time, the remote computer system can then: serve a prompt to the administrator of the agile work environment to collect and store human effects remaining at this agile desk, such as in a lost-and-found bin; and update the agile desk manager to indicate that this agile desk is available.

Alternatively, in the foregoing implementation, the sensor block can push desk occupancy and/or other relevant data for the agile work environment to the remote computer system on a regular interval, such as at the conclusion of every scan cycle or every other scan cycle; and the remote computer system can remotely apply rules to these data to selectively inform an administrator of an agile desk rule violation and/or to automatically update the agile desk manager to reflect a change in desk availability responsive to such a rule violation. The sensor block and the remote computer system can thus cooperate to collect and leverage agile desk occupancy data to automatically reopen desks that may have been abandoned and/or at which human effects or mobile assets may have been forgotten, thereby improving efficiency of agile desks throughout the agile work environment.

The remote computer system can also selectively pull data from a sensor block. For example, a particular employee may reserve an agile desk in the agile work environment through the agile desk manager, such as by: logging in to the agile desk manager through a web browser or native application executing on her smartphone or laptop computer; selecting a time window (e.g., hours or days up to a reservation time limit) for an agile desk reservation; selecting a particular agile desk that is available for reservation during this time window; and then confirming a reservation of this particular agile desk. In this example, the remote computer system can also store a rule that employees occupy their reserved agile desks within one hour of the start of their reservations in the agile work environment. To apply this rule, the remote computer system can reference a global desk map of the agile work environment to identify a particular sensor block defining a field of view that contains the particular agile desk reserved by the particular employee. If the particular sensor block failed to indicate that the particular desk is occupied since the start time of the particular employee's reservation (e.g., over five scan cycles since the start time of the reservation) and the one-hour delay period since the start of this reservation has expired, the remote computer system can push a request to the particular sensor block for a state of desks in its field of view. Upon receipt of this request from the remote computer system (e.g., via the gateway), the particular sensor block can execute a scan cycle and return desk occupancy data for desks in its field of view to the remote computer system in (near) real-time. If these data returned by the particular sensor block at the end of the one-hour delay period of the reservation indicate that the particular agile desk reserved by the particular employee is now occupied, the remote computer system can preserve this reservation in the agile desk manager. However, if these data returned by the particular sensor block indicate that the particular agile desk is still not occupied, the remote computer system can clear this reservation from the agile desk manager and note the particular agile desk as now available in the agile desk manager.

However, the sensor block can push data to the remote computer system and/or the remote computer system can pull data from the sensor block responsive to any other event in Block S150. The remote computer system can then update the agile desk manager to reflect occupancy and vacancy of the agile desks in the agile wireless network based on these data returned by the sensor block.

In this variation, the remote computer system can also implement methods and techniques similar to those described above to selectively control HVAC, lighting, and/or other facility controls in Block S170 based on data received from the sensor block in the agile work environment.

11. Other Work Areas

Sensor blocks distributed throughout other regions of the facility—such as in a cafeteria, a lobby or reception area, a lounge, a hallway, a parking lot, and/or a courtyard—can implement similar methods and techniques to transition between the inactive and active states, to execute scan cycles while in the active state, and to selectively offload occupancy and related data to the remote computer system. The remote computer system can then implement methods and techniques similar to those described above to modify a rate of air exchange, to modify air temperature, or to modify lighting, etc. within these areas of the facility based on occupancy data returned by nearby sensor blocks.

The remote computer system can thus implement the foregoing methods and techniques to update schedulers in Block S160 and/or to serve commands to various actuators in the facility in Block S170 based on occupancy data received from many sensor blocks throughout the facility over time. For example, the remote computer system can: merge occupancy data last received from these many distributed sensor blocks into a global occupancy map representing approximate occupancy of the facility at the current time; and then selectively update schedulers, serve commands to various actuators, and/or serve prompts to an administrator to direct her attention to particular areas of the facility based on the global occupancy map.

12. Scan Cycle Frequency

As described above, a sensor block can regularly execute scan cycles while in the active state, such as in fixed, ten-minute intervals. Alternatively, the sensor block can implement a time interval—between scan cycles—of duration based on a type of space that the sensor block occupies. For example, the remote computer system can assign a shortest time interval to sensor blocks installed in spaces used least (i.e., characterized by the longest durations of vacancy) or characterized by greatest rates of occupancy change. In this example, the remote computer system can assign: a five-minute interval to a sensor block installed in a conference room; a ten-minute interval to a sensor block installed in a cafeteria or kitchen; a twenty-minute interval to a sensor block installed in an agile work environment containing many agile desks; and a thirty-minute interval to a sensor block installed in a work environment containing dedicated desks.

In another implementation, a sensor block can dynamically modify the time interval it implements between consecutive scan cycles (i.e., the duration of low-power periods between consecutive scan cycles while in the active state) as an inverse function of a rate of change of total occupancy that the sensor block has detected in its field of view over preceding scan cycles.

However, the sensor block and/or the remote computer system can set or modify this time interval for the sensor block based on any other characteristic of the sensor block or a space in which the sensor block is installed.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for monitoring occupancy comprising:
   at a first time, accessing a first image recorded by a sensor block, the sensor block defining a field of view intersecting a space within a facility and encompassing a work surface in the space;
   detecting absence of humans within a threshold distance of the work surface in the first image;
   detecting a set of personal objects in the first image, the set of personal objects carried by humans in the space and excluding assets affiliated with the space;
   in response to detecting absence of humans in the first image and in response to detecting the set of personal objects within the threshold distance of the work surface:
      identifying the work surface in an occupied with human absent state; and
      updating a scheduler to indicate the occupied with human absent state of the work surface;
   accessing a second image recorded by the sensor block at a second time;
   detecting a human within the threshold distance of the work surface in the second image; and
   in response to detecting the human within the threshold distance of the work surface:
      identifying the work surface in an occupied with human present state; and
      updating the scheduler to indicate the occupied with human present state of the work surface.

2. The method of claim 1, further comprising:
   accessing a third image recorded by the sensor block at a third time;
   detecting absence of humans and absence of personal objects within the threshold distance of the work surface in the third image; and
   in response to detecting absence of humans and absence of personal objects within the threshold distance of the work surface:
      identifying the work surface in a vacant state; and
      updating the scheduler to indicate the vacant state of the work surface.

3. The method of claim 1:
   wherein detecting the set of personal objects in the first image comprises detecting the set of personal objects within the threshold distance of the work surface in the first image, the set of personal objects comprising a first set of human effects; and
   further comprising, at the first time:
      calculating a first quantity of human effects based on the first set of human effects in the first image; and
      in response to detecting absence of humans in the first image and in response to detecting the first quantity of human effects exceeding a threshold quantity of human effects:
         identifying the work surface in the occupied with human absent state; and
         transmitting the occupied with human absent state of the work surface to a remote computer system to update the scheduler.

4. The method of claim 3, further comprising:
   accessing a third image recorded by the sensor block at a third time;
   detecting absence of humans within the threshold distance of the work surface in the third image;
   detecting a second set of personal objects within the threshold distance of the work surface in the third image, the second set of personal objects comprising a second set of human effects;
   calculating a second quantity of human effects based on the second set of human effects in the third image; and
   in response to detecting absence of humans within the threshold distance of the work surface and in response to the second quantity of humans falling below the threshold quantity of human effects:
  identifying the work surface in a vacant state; and
  updating the scheduler to indicate the vacant state of the work surface.

5. The method of claim 1:
  wherein accessing the first image recorded by the sensor block at the first time comprises accessing the first image recorded by the sensor block at the first time, the sensor block defining the field of view intersecting a lounge area within the facility and encompassing the work surface comprising a table in the space;
  wherein detecting absence of humans within the threshold distance of the work surface in the first image comprises detecting absence of humans within the threshold distance of a centroid of the table in the first image;
  wherein updating the scheduler to indicate the occupied with human absent state of the work surface comprises updating the scheduler to indicate the occupied with human absent state of the table;
  wherein detecting the human within the threshold distance of the work surface in the second image comprises detecting the human within the threshold distance of the centroid of the table in the second image; and
  wherein updating the scheduler to indicate the occupied with human present state of the work surface comprises updating the scheduler to indicate the occupied with human present state of the table.

6. The method of claim 1:
  wherein accessing the first image recorded by the sensor block at the first time comprises accessing the first image recorded by the sensor block at the first time, the sensor block defining the field of view intersecting the space within the facility and encompassing the work surface comprising a desk in the space;
  wherein detecting absence of humans within the threshold distance of the work surface in the first image comprises detecting absence of humans within a predefined area associated with the desk in the first image;
  wherein the detecting the set of personal objects in the first image comprises detecting the set of personal objects in the first image, the set of personal objects comprising a set of human effects carried by humans in the space and excluding assets affiliated with the space;
  wherein identifying the work surface in the occupied with human absent state comprises identifying the desk in the occupied with human absent state;
  wherein updating the scheduler to indicate the occupied with human absent state of the work surface comprises updating a desk manager to indicate the occupied with human absent state of the desk;
  wherein detecting the human within the threshold distance of the work surface in the second image comprises detecting the human within the predefined area associated with the desk in the second image;
  wherein identifying the work surface in the occupied with human present state comprises identifying the desk in the occupied with human present state; and
  wherein updating the scheduler to indicate the occupied with human present state of the work surface comprises updating the desk manager to indicate the occupied with human present state of the desk.

7. The method of claim 1:
  wherein accessing the first image recorded by the sensor block at the first time comprises accessing the first image recorded by the sensor block at the first time, the sensor block defining the field of view intersecting the space within the facility and encompassing the work surface comprising a conference table in the space;
  wherein detecting absence of humans within the threshold distance of the work surface in the first image comprises detecting absence of humans within a predefined area associated with the conference table in the first image;
  wherein updating the scheduler to indicate the occupied with human absent state of the work surface comprises updating a conference table manager to indicate the occupied with human absent state of the conference table;
  wherein detecting the human within the threshold distance of the work surface in the second image comprises detecting the human within the predefined area associated with the conference table in the second image; and
  wherein updating the scheduler to indicate the occupied with human present state of the work surface comprises updating the conference room manager to indicate the occupied with human present state of the conference table.

8. The method of claim 1:
  wherein accessing the first image recorded by the sensor block at the first time comprises accessing the first image recorded by the sensor block at the first time, the sensor block defining the field of view intersecting a conference room within the facility and encompassing the work surface comprising a conference table in the conference room;
  further comprising, at the first time, detecting an empty chair in a first location in the first image;
  wherein detecting the set of personal objects in the first image comprises detecting the set of personal objects adjacent the first location of the empty chair and within the threshold distance of the conference table;
  further comprising:
    in response to detecting the set of personal objects adjacent the first location of the empty chair, associating the set of personal objects with the conference table; and
    in response to detecting absence of humans in the first image and in response to associating the set of personal objects with the conference table:
      identifying the conference table in the occupied with human absent state; and
      updating a conference room manager to indicate the occupied with human absent state of the conference table.

9. The method of claim 1:
  further comprising at the first time:
    accessing a specification of the space defining a set of human indicator values annotated with types of personal objects;
    for each object in the set of personal objects:
      detecting a type of the personal object;
      assigning a human indicator value from the specification to the type of the personal object;
      detecting a distance between the personal object and a centroid of the work surface; and
      weighting the human indicator value of the personal object based on the distance between the personal object and a centroid of the work surface; and
    deriving a probability of the work surface in the occupied with human absent state based on human indicator values of the set of personal objects; and wherein identifying the work surface in the occupied with human absent state comprises identifying the work surface in the occupied with human absent state:
  in response to the probability of the work surface in the occupied with human absent state exceeding a threshold probability; and
  in response to detecting absence of humans in the first image.

10. The method of claim 1:
wherein accessing the first image recorded by the sensor block comprises accessing the first image recorded by the sensor block, the sensor block defining the field of view intersecting a conference room within the facility and encompassing the work surface comprising a whiteboard;
wherein detecting the human within the threshold distance of the work surface in the second image comprises detecting a first set of humans, comprising the human, within the threshold distance of the whiteboard in the second image; and
further comprising, at the second time:
  detecting a second set of humans, different than the first set of humans, within the conference room;
  characterizing a total quantity of humans in the conference room based on the first set of humans and the second set of humans;
  calculating a meeting quality of the conference room proportional to the total quantity of humans in the conference room; and
  in response to the total quantity of humans in the conference room exceeding a threshold quantity of humans:
    identifying the conference room in the occupied with human present state; and
    updating the scheduler to indicate the occupied with human present state of the conference room and the meeting quality of the conference room.

11. The method of claim 1:
wherein accessing the first image recorded by the sensor block comprises accessing the first image recorded by the sensor block, the sensor block defining the field of view intersecting a conference room within the facility and encompassing the work surface comprising a whiteboard;
wherein detecting the human within the threshold distance of the work surface in the second image comprises detecting a first set of humans, comprising the human, within the threshold distance of a known location of the whiteboard in the second image; and
further comprising, at the second time:
  characterizing a first quantity of humans in the conference room based on the first set of humans;
  calculating a meeting quality of the conference room proportional to the first quantity of humans in the conference room; and
  in response to detecting the first set of humans within the threshold distance of the whiteboard and in response to calculating a meeting quality greater than a threshold meeting quality:
    identifying the conference room in the occupied with human present state; and
    updating the scheduler to indicate the occupied with human present state of the conference room and the meeting quality of the conference room.

12. The method of claim 1:
wherein accessing the first image recorded by the sensor block at the first time comprises accessing the first image recorded by the sensor block at the first time, the sensor block defining the field of view intersecting the space within the facility and encompassing the work surface comprising a desk in the space;
wherein updating the scheduler to indicate the occupied with human absent state of the work surface comprises updating a desk manager to indicate the occupied with human absent state of the desk with a first graphical representation; and
wherein updating the scheduler to indicate the occupied with human present state of the work surface comprises updating the desk manager to indicate the occupied with human present state of the desk with a second graphical representation distinct from the first graphical representation.

13. The method of claim 1:
wherein updating the scheduler to indicate the occupied with human absent state of the work surface comprises transmitting the occupied with human absent state of the work surface to a remote computer system to update the scheduler; and
wherein updating the scheduler to indicate the occupied with human present state of the work surface comprises transmitting the occupied with human present state of the work surface to the remote computer system to update the scheduler.

14. A method for monitoring occupancy comprising:
accessing a first image recorded by a sensor block, the sensor block defining a field of view intersecting a space within a facility and encompassing a first work surface and a second work surface in the space;
detecting absence of humans within a threshold distance of the first work surface in the first image;
detecting a first set of personal objects in the first image, the first set of personal objects carried by humans in the space and excluding assets affiliated with the space;
in response to detecting absence of humans in the first image and in response to detecting the first set of personal objects within the threshold distance of the first work surface, identifying the first work surface in an occupied with human absent state;
detecting a human within the threshold distance of the second work surface in the first image;
in response to detecting the human within the threshold distance of the second work surface, identifying the second work surface in an occupied with human present state; and
updating a scheduler to indicate the first work surface in the occupied with human absent state and to indicate the second work surface in the occupied with human present state.

15. The method of claim 14:
wherein accessing the first image recorded by the sensor block at the first time comprises accessing the first image recorded by the sensor block at the first time, the sensor block defining the field of view intersecting the space within the facility and encompassing the first work surface comprising a first desk and the second work surface comprising a second desk in the space;
further comprising:
  accessing a first predefined area associated with the first desk and a second predefined area associated with the second desk;
  defining a first boundary encompassing the first desk in the first image according to the first predefined area associated with the first desk; and defining a second boundary encompassing the second desk in the first image according to the second predefined area associated with the first desk;

wherein detecting absence of humans within the threshold distance of the first work surface in the first image comprises detecting absence of humans within the first boundary encompassing the first desk in the first image; and wherein detecting the human within the threshold distance of the second work surface in the first image comprises detecting the human within the second boundary encompassing the second desk in the first image.

16. The method of claim 14:

further comprising, at the first time, accessing a set of definitions of an occupied state for a desk-type asset comprising:
  a first definition of an occupied with human present state for the desk-type asset; and
  a second definition of an occupied with human absent state for the desk-type asset;
wherein accessing the first image recorded by the sensor block at the first time comprises accessing the first image recorded by the sensor block at the first time, the sensor block defining the field of view intersecting the space within the facility and encompassing the first work surface comprising a first desk and the second work surface comprising a second desk in the space;
further comprising, at the first time, extracting a first set of features associated with the first desk from the first image, the first set of features representing a set of personal objects, the set of personal objects carried by humans in a work environment and excluding fixed assets defined by an administrator;
wherein detecting absence of humans within the threshold distance of the first work surface in the first image comprises detecting absence of humans within a predefined area of the first desk based on the first set of features;
wherein detecting the first set of personal objects in the first image comprises detecting the first set of personal objects within the predefined area of the first desk based on the first set of features; and
wherein identifying the first work surface in the occupied with human absent state comprises in response to detecting the first set of human effects and absence of humans within the predefined area associated with the first desk from the first image, identifying the first desk in the occupied with human absent state according to the second definition.

17. The method of claim 16:

further comprising, at the second time, extracting a second set of features associated with the second desk from the first image;
wherein detecting the human within the threshold distance of the second work surface in the first image comprises detecting the human within a predefined area of the second desk based on the second set of features;
wherein identifying the second work surface in the occupied with human present state comprises in response to detecting the human within the predefined area of the second desk, identifying the second desk in the occupied with human present state according to the first definition; and wherein updating the scheduler comprises updating the scheduler to indicate the first desk in the occupied with human absent state and to indicate the second desk in the occupied with human present state.

18. The method of claim 14, wherein updating the scheduler to indicate the first work surface in the occupied with human absent state and to indicate the second work surface in the occupied with human present state comprises:
  updating the scheduler to indicate a first location and the occupied with human absent state of the first work surface; and
  updating the scheduler to indicate a second location, different than the first location, and the occupied with human present state of the second work surface.

19. A method for monitoring occupancy comprising:

at a first time:
  accessing a first image recorded by a sensor block, the sensor block defining a field of view intersecting a space within a facility and encompassing a work surface in the space;
  detecting absence of humans within a threshold distance of the work surface in the first image;
  detecting a personal object in the first image, the personal object carried by humans in the space and excluding assets affiliated with the space; and
  in response to detecting absence of humans in the first image and in response to detecting the personal object within the threshold distance of the work surface:
    identifying the work surface in an occupied with human absent state; and
    updating a scheduler to indicate the occupied with human absent state of the work surface; and
at a second time:
  accessing a second image recorded by the sensor block;
  detecting the personal object within the threshold distance of the work surface in the second image;
  detecting absence of humans within the threshold distance of the work surface in the second image;
  calculating an elapsed time between the first time and the second time; and
  in response to the elapsed time exceeding an abandonment time period, identifying the work surface as abandoned; and
  updating the scheduler to highlight the work surface as abandoned.

20. The method of claim 19:

wherein accessing the first image recorded by the sensor block comprises accessing the first image recorded by the sensor block, the sensor block defining the field of view intersecting a conference room within the facility and encompassing the work surface comprising a conference table;
wherein detecting the personal object in the first image comprises detecting the personal object comprising a bag;
wherein updating the scheduler to highlight the work surface as abandoned comprises, updating the conference room manager to highlight the conference table and the bag within the threshold distance of the conference table as abandoned; and
further comprising, at the second time, prompting a user to remove the bag from the conference table.

* * * * *